United States Patent
Patel et al.

(10) Patent No.: US 10,831,602 B2
(45) Date of Patent: Nov. 10, 2020

(54) DYNAMICALLY MERGING PARITY DATA FOR MULTIPLE DATA STRIPES

(71) Applicant: International Business Machines Corporation, Armonk, NY (US)

(72) Inventors: Kushal Patel, Pune (IN); Karve Shrikant Vinod, Pune (IN); Sarvesh Patel, Pune (IN); Sasikanth Eda, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 15/947,457

(22) Filed: Apr. 6, 2018

(65) Prior Publication Data

US 2019/0310916 A1    Oct. 10, 2019

(51) Int. Cl.
  *G06F 11/00* (2006.01)
  *G06F 11/10* (2006.01)
  *G06F 3/06* (2006.01)

(52) U.S. Cl.
  CPC ........ *G06F 11/1092* (2013.01); *G06F 3/0619* (2013.01); *G06F 3/0653* (2013.01); *G06F 3/0689* (2013.01); *G06F 11/1096* (2013.01)

(58) Field of Classification Search
  None
  See application file for complete search history.

(56) References Cited

U.S. PATENT DOCUMENTS

| | | | |
|---|---|---|---|
| 6,151,659 A | 11/2000 | Solomon et al. | |
| 6,751,136 B2 | 6/2004 | Hetrick et al. | |
| 7,055,058 B2 | 5/2006 | Lee et al. | |
| 8,099,623 B1 | 1/2012 | Li et al. | |
| 8,527,699 B2 | 9/2013 | Galloway et al. | |
| 9,606,866 B2 | 3/2017 | Taranta, II | |
| 9,632,870 B2 | 4/2017 | Bennett | |
| 2003/0231529 A1* | 12/2003 | Hetrick | G06F 11/1092 365/200 |
| 2006/0117216 A1* | 6/2006 | Ikeuchi | G06F 11/0727 714/6.2 |
| 2008/0177815 A1* | 7/2008 | Ito | G06F 11/1076 708/492 |

OTHER PUBLICATIONS

The Magic of XOR, available at https://web.archive.org/web/20051204172015/http://www.cs.umd.edu/class/sum2003/cmsc311/Notes/BitOp/xor.html (Year: 2005).*

* cited by examiner

*Primary Examiner* — David Yi
*Assistant Examiner* — Craig S Goldschmidt
(74) *Attorney, Agent, or Firm* — Kunzler Bean & Adamson

(57) ABSTRACT

Methods that can dynamically merge parity data for multiple data stripes are provided. One method includes detecting, by a processor, a disk failure in a redundant array of independent disks (RAID) configuration and, in response to detecting the disk failure, merging parity data stored in a plurality of sets of segments in a stripe of the RAID configuration to free space in a set of parity segments of the plurality of sets of segments. Systems and computer program products for performing the method are also provided.

20 Claims, 14 Drawing Sheets

DYNAMICALLY MERGING PARITY DATA FOR MULTIPLE DATA STRIPES

FIELD

The subject matter disclosed herein relates to storage networks and systems and, more particularly, relates to methods and systems that can dynamically merge parity data for a plurality of data stripes.

BACKGROUND

Redundant Array of Independent Disks (RAID) configurations can provide a mechanism for redundantly storing the same data in different places on multiple disks (e.g., hard disks). By placing data on multiple disks, input/output (I/O) operations can overlap in a balanced way, which can improve performance. A typical RAID configuration includes multiple disks where the data is written in a "stripe" across the disks. A stripe typically includes corresponding data sectors on each disk that store a portion of the data and can also store calculated "parity" data for the other data sectors in the stripe stored in one data sector (e.g., RAID 3, RAID, 4, and RAID 5) or two data sectors (e.g., RAID 6).

In conventional RAID configurations, data access processing nodes are assigned to groups of hard disks so that data access may be coordinated and/or controlled by the processing node(s). Further, the parity data can be used to recover the data stored on a failed disk or a disk that has otherwise become unavailable. That is, if one or more disks suffer a failure rendering its/their respective portion of a stripe inaccessible, the lost data may be reconstructed from one or more of the other disks using one or more reconstruction techniques. As such, RAID technology can provide high availability to data and can also facilitate data integrity for a storage system even though a disk may fail. Furthermore, since multiple disks can increase the mean time between system failures, redundantly storing data may also increase the fault tolerance of a storage system.

BRIEF SUMMARY

Methods and systems that can merge parity data for multiple data stripes are provided. One method includes detecting, by a processor, a disk failure in a redundant array of independent disks (RAID) configuration and, in response to detecting the disk failure, merging parity data stored in a plurality of sets of segments in a stripe of the RAID configuration to free space in a set of parity segments of the plurality of sets of segments.

A system includes a detection module that detects disk failures in a RAID configuration and a parity module that, in response to a disk failure, merges parity data stored in a plurality of sets of segments of the RAID configuration. In some embodiments, at least a portion of the modules include one or more of a set of hardware circuits, a set of programmable hardware devices, and executable code stored on a set of computer-readable storage mediums.

Also disclosed are computer program products including a computer-readable storage medium including program instructions embodied therewith that can integrate resources at a disaster recovery site. Some program instructions are executable by a processor and cause the processor to detect a disk failure in a RAID configuration and, in response to detecting the disk failure, merge parity data stored in a plurality of sets of segments in a stripe of the RAID configuration to free space in a set of parity segments of the plurality of sets of segments.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which.

DETAILED DESCRIPTION

Figure 1:
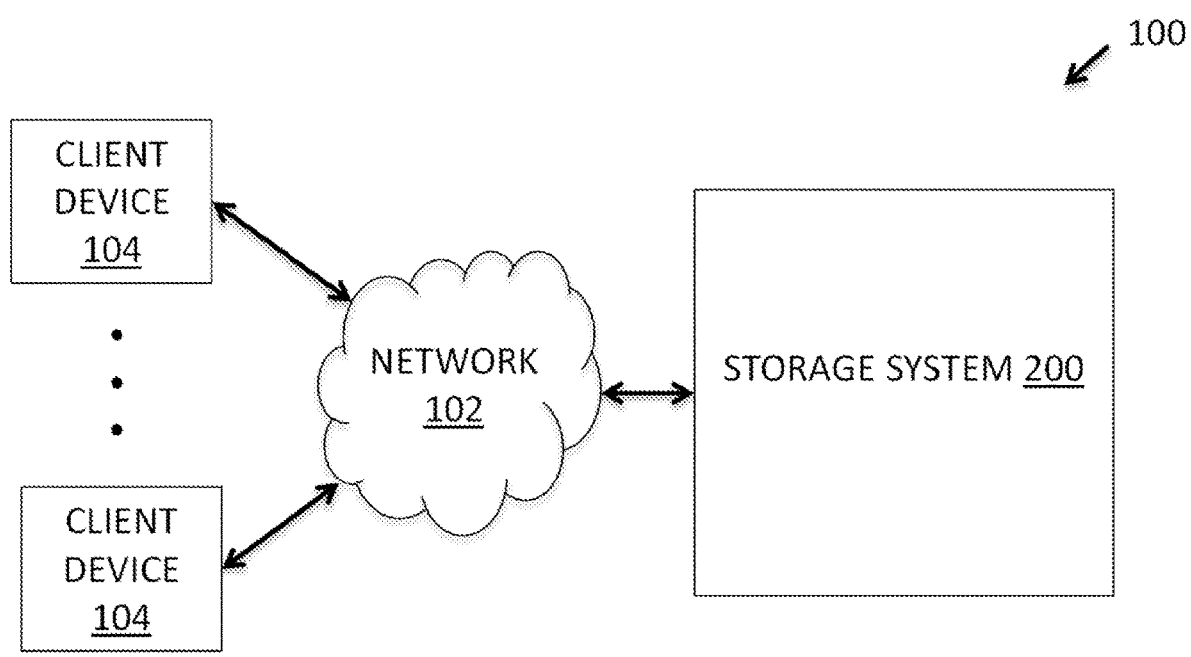
FIG. 1 is a block diagram of one embodiments of a storage network.

Disclosed herein are various embodiments providing methods, systems, and computer program products that can merge parity data for multiple data stripes. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1 is a block diagram of one embodiment of a storage network 100 (or system) including a network 102 connecting a set of client devices 104 and a storage system 200. The network 102 may be any suitable wired and/or wireless network 102 (e.g., public and/or private computer networks in any number and/or configuration (e.g., the Internet, an intranet, a cloud network, etc.)) that is known or developed in the future that enables the set of storage devices 104 and the storage system 200 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

A client device 104 can be any suitable computing hardware and/or software (e.g., a thick client, a thin client, or hybrid thereof) capable of accessing the storage system 100 via the network 75. Each client device 75, as part of its respective operation, relies on sending I/O requests to the storage system 200 to write data, read data, and/or modify data. Specifically, each client device 104 can transmit I/O requests to read, write, store, communicate, propagate, and/or transport instructions, data, computer programs, software, code, routines, etc., to the storage system 200 and may comprise at least a portion of a client-server model. In general, the storage system 200 can be accessed by the client device(s) 104 and/or communication with the storage system 200 can be initiated by the client device(s) 104 through a network socket (not shown) utilizing one or more interprocess networking techniques.

Figure 2:
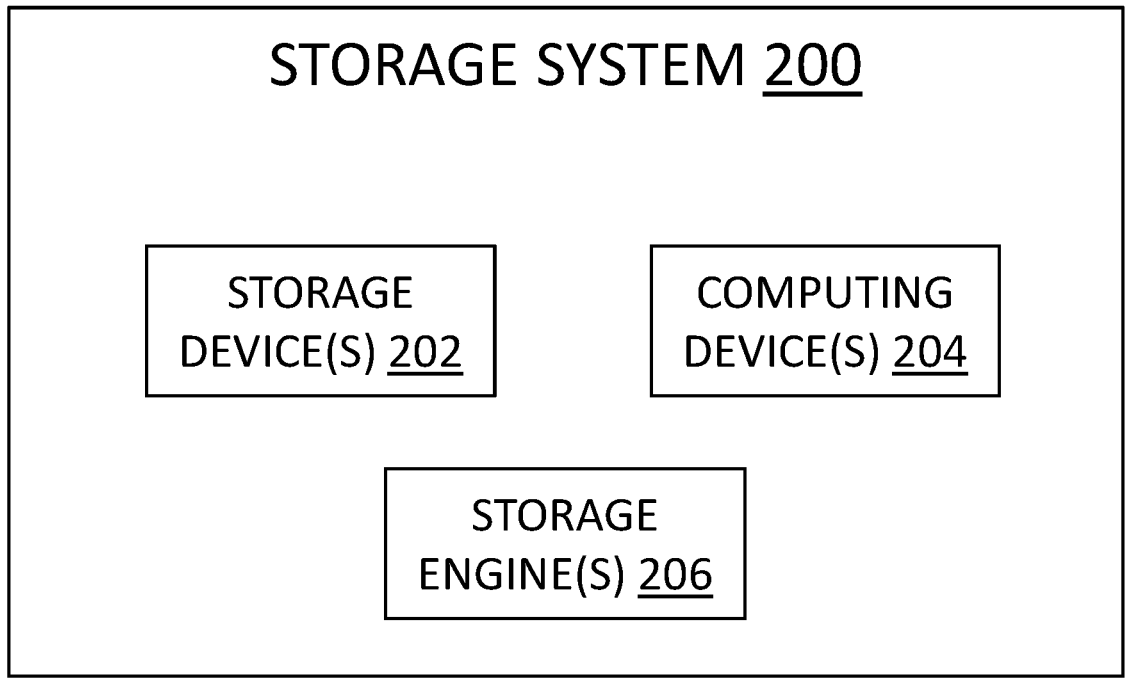
FIG. 2 is a block diagram of one embodiment of a storage system included in the storage network of FIG. 1.

Referring to FIG. 2, the storage system 200, at least in the illustrated embodiment, includes, among other components, a set of storage devices 202, a set of computing devices 204 in which each computing device includes a set of processor 206, and a set of storage engines 208 coupled to and/or in communication with one another. The storage devices 202 (also simply referred individually, in various groups, or collectively as storage device(s) 202) may be any suitable type of device and/or system that is known or developed in the future that can store computer-useable data. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 202 (e.g., a disk drive, a hard drive, a hard disk drive (HDD), etc.) may include a set of computer-readable and/or computer-useable disks implementing a redundant array of independent disk (RAID) configuration. In various embodiments, the RAID configuration may include any suitable configuration that utilizes and/or makes use of one or more spare disks for rebuilding data when one or more disks in the storage device 202 become unavailable (e.g., fails, goes offline, etc.). For example, the RAID configuration may be implemented as RAID 3, RAID 4, RAID 5, RAID 6, etc., among other configurations that utilize and/or make use of one or more spare disks that are possible and contemplated herein. In some embodiments, the RAID configuration can be arranged in a distributed RAID (DRAID) configuration.

The set of disks in a RAID or DRAID configuration may include any suitable quantity of disks that can implement a RAID or DRAID configuration. In various embodiments, a RAID or DRAID configuration can include five hundred twelve (512) disks, although other quantities greater than or less than 512 disks are possible and contemplated herein.

A disk in a RAID or DRAID configuration may include any suitable size that can store data. In various embodiments, a disk in a RAID or DRAID configuration may include a size of about 4 kilobytes (4 KB), although other sizes larger than or smaller than 4 KB are possible and contemplated herein.

In some embodiments, a RAID or DRAID can store data in one or more data stripes spread across multiple disks. A data stripe can include any suitable size and/or be across any suitable quantity of disks of a RAID or DRAID configuration. That is, a data stripe may include any suitable quantity of sectors in which each sector is stored on a respective disk of a RAID or DRAID configuration. In some embodiments, each stripe includes five (5) sectors, although other sector quantities are possible and contemplated herein.

The individual sectors forming a data stripe may include a combination of data sectors (e.g., raw data, compressed data, and/or encrypted data), one or more parity data sectors, and one or more spare area sectors spread across a corresponding quantity of disks in a RAID or DRAID configuration. The data sectors may be arranged to include any suitable quantity combination of data sectors and parity data sectors. That is, a stripe may include a combination of any suitable quantity of data sectors and any suitable quantity of parity data sectors, which can effectively be converted to spare areas and/or rebuild areas.

In various embodiments, a segment of a data stripe in a DRAID can be split off from the data stripe and be utilized as a spare/rebuild area to rebuilt data on a failed/failing disk. The spare/rebuild area can use P parity data to rebuild the data for a failed/failing disk. In further embodiments, the DRAID includes a plurality of rebuild areas that use multiple parity data (e.g., a P data parity and a Q data parity) to rebuild the data for data stored in their respective stripe, although the scope and spirit of the various embodiments are not limited to two rebuild areas (e.g., can include three or more rebuild areas and/or use three or more parity data for rebuilding data). That is, multiple segments can be split from a data stripe and utilized as a rebuild area for rebuilding the data of a failed/failing disk.

In various embodiments, a data stripe may include three (3) data sectors, although a sector quantity of one (1) data sector, two (2) data sectors, and quantities of data sectors greater than three sectors are possible and contemplated herein. The sectors of a data stripe may be across any suitable quantity of disks in a RAID or DRAID configuration.

In some embodiments, a data stripe can be across four (4) disks, although other disks quantities are possible and contemplated herein. Further, a data stripe across four disks may be widened and/or increased resulting from the merging of parity data for multiple data stripes.

A data stripe across four disks, in some embodiments, can be widened to be across seven (7) disks, among other quantities that are possible and contemplated herein. For example, in a 3D+P construction across four disks can be widened to include a 3D+P+3D construction or a 6D+P construction across seven disks, which can create a spare/rebuild area (e.g., 1S).

In other embodiments, a data stripe can be across five (5) disks, although other disks quantities are possible and contemplated herein. Further, a data stripe across five disks may be widened and/or increased resulting from the merging of parity data for multiple data stripes.

A data stripe across five disks, in some embodiments, can be widened to be across eight (8) disks, among other quantities that are possible and contemplated herein. For example, in a 3D+P+Q construction across five disks can be widened to include a 3D+P+Q+3D construction or a 6D+P+Q construction across eight disks, which can create two spare/rebuild areas (e.g., 2S).

A set of computing devices 204 (also simply referred individually, in various groups, or collectively as computing device(s) 204) may include any type of hardware and/or software that is known or developed in the future that can perform computing operations. In various embodiments, the computing device(s) 204 can perform I/O operations related to one or more suitable services and/or applications, which can be any service and/or application that is known or developed in the future.

A set of storage engines 206 (also simply referred individually, in various groups, or collectively as storage engine(s) 206) may include non-volatile/persistent hardware and/or software (e.g., a processor) configured to perform and/or facilitate data storage operations on the storage devices 202, including, but not limited to, data archiving, data backup, data rebuilding, data mirroring, replicating data, etc. For instance, a storage engine 206 may include non-volatile and/or persistent hardware and/or software to perform long-term data storage operations on the storage devices 202, which may include write operations, read operations, read-write operations, etc., among other operations that are possible and contemplated herein.

In various embodiments, a storage engine 206 may include hardware and/or software that can receive I/O requests (e.g., write request, read request, and/or read-write request, etc.) from the client device(s) 102 (see FIG. 1) and perform corresponding I/O operations (e.g., write operations, read operations, and/or read-write operations, etc.) on the set of storage devices 202 in response thereto. A storage engine 206 may further include hardware and/or software for executing instructions in one or more applications to manage storage operations on the storage system 100 and/or the functionality of the set of storage devices 202.

Figure 3A:
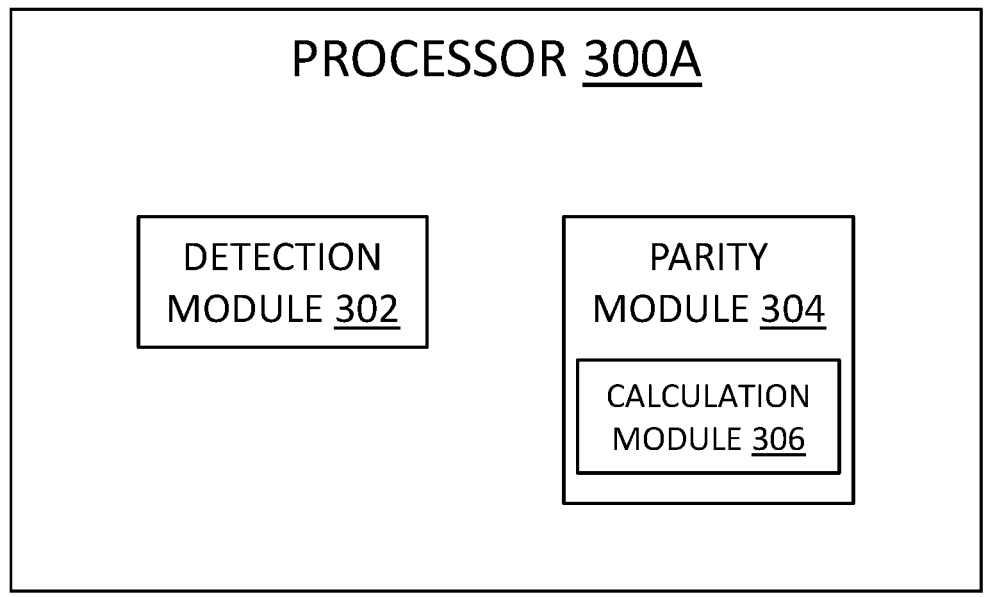
FIGS. 3A and 3B are block diagrams of various embodiments of a processor included in the storage system of FIG. 2.

With reference to FIG. 3A, FIG. 3A is a block diagram of one embodiment of a processor 300A that can be included in and/or as a portion of a storage engine 206. At least in the illustrated embodiment, a processor 300A may include, among other components, a detection module 302 and a parity module 304 coupled to and/or in communication with one another.

A detection module 302 may include any suitable hardware and/or software that can detect when a disk in a RAID configuration is unavailable and/or may become unavailable. In various embodiments, a detection module 302 can monitor one or more disks in one or more RAID configurations. Further, a detection module 302, in some embodiments, can determine the health of the one or more disks in the RAID configuration. For example, a detection module 302 may be configured to detect a disk failure and/or that a disk may fail in the relative near future, although other types of unavailability (e.g., offline, corrupted, etc.) are possible and contemplated herein. A detection module 302 may determine that a disk has failed and/or is about to fail using any suitable technique that is known or developed in the future. In additional embodiments, a detection module 302 can determine that a disk is healthy and/or is not about to fail in the near future.

A parity module 304 may include any suitable hardware and/or software that can merge parity data in response to a detection module 302 detecting that a disk is unavailable (e.g., has failed) and/or will become unavailable (e.g., is failing). That is, a parity module 304 may be configured to merge parity data for data stored in one area with different parity data for different data stored in a different area in response to a disk failure.

In various embodiments, a parity module 304 can merge (e.g., transfer, write, etc.) the parity data for the data in the failed disk and/or the data in one or more disks adjacent to the failed disk with parity data for data stored in one or more adjacent stripes. That is, the parity module 304 can merge the parity data for a plurality of adjacent data stripes.

In one embodiment, a parity module 304 can retrieve and/or collect the parity data for a plurality of adjacent data stripes. For example, the parity module 304 can retrieve and/or collect the parity data (e.g., a P parity data and/or a Q parity data) for a first data stripe and the parity data (e.g., a P parity data and/or a Q parity data) for a second data stripe that is adjacent to the first data stripe.

In further embodiments, after the parity data is retrieved and/or collected, the parity module 304 can delete the parity data for the first data stripe or the second data stripe from the disk(s) storing the first data stripe or the second data stripe. In some embodiments, the parity data for the data stored on the set of healthy disks storing a data stripe is deleted. Specifically, when the failed or failing disk is storing data in the first data stripe, the parity data for the second data stripe (e.g., the P parity data and/or the Q parity data for the second data stripe) is deleted from the disk(s) storing the second data stripe to free up space in one or more disks storing the second data stripe. Likewise, when the failed or failing disk is storing data in the second data stripe, the parity data for the first data stripe (e.g., the P parity data and/or the Q parity data for the first data stripe) is deleted from the disk(s) storing the first data stripe to free up space in one or more disks storing the first data stripe.

A parity module 304, in some embodiments, can include a parity calculation module 306 that can calculate parity data (e.g., a P parity data and/or a Q parity data) for one or more data stripes in a RAID or DRAID configuration. The P parity data and the Q parity data may be calculated using any suitable calculation technique that is known or developed in the future. In some embodiments, the P parity data and Q parity data may be calculated using the following equations:

$$D(x) = D_0 + D_1 x + \ldots + D_{n-1} x^{n-1}. \text{ Then,}$$

$$P = D(1) = D_0 \oplus D_1 \oplus \ldots \oplus D_{n-1}$$

$$Q = D(\alpha) = D_0 \oplus D_1 \cdot \alpha \oplus \ldots \oplus D_{n-1} \cdot \alpha^{n-1}$$
$$= ((\ldots(D_{n-1} \cdot \alpha \oplus D_{n-2}) \cdot \alpha \oplus \ldots \oplus D_1 \cdot \alpha) \oplus D_0$$

Here, the data (e.g., $D_0, D_1, \ldots D_n$) are chunks of data of a single data stripe stored on respective disks of a RAID configuration or DRAID configuration. For example, $D_0$ can represent data stored on an initial disk (e.g., a disk 0), $D_1$ can represent data stored on a first disk (e.g., disk 1) after the initial disk 0, and $D_n$ can represent data stored on a concluding or last disk (e.g., a disk N) of a RAID or DRAID configuration.

In various embodiments, a parity module 304 writes the calculated P parity data and/or the calculated Q parity data for a data stripe to one or more disks adjacent to and/or proximate to the disk(s) storing the data stripe, although other locations are possible and contemplated herein. In some embodiments, the P parity data and the Q parity data for a data stripe are stored on separate disks that can be proximate to and/or adjacent to one another, although other locations are possible and contemplated herein.

In some embodiments, a parity module 304, in response to detection of a failed and/or failing disk, can determine if there is an sufficient amount of available free space on one or more healthy disks in a RAID or DRAID configuration for rebuilding the data on the failed/failing disk. In other words, the parity module 304 can identify the free space on one or more healthy disks in the RAID or DRAID configuration for rebuilding the data on the failed/failing disk. In response to determining that there is a sufficient amount of available free space on the healthy disk(s) for rebuilding data on the failed/failing disk, the parity module 304 can direct and/or command a rebuild module (see rebuild module 308 in FIG. 3B) to use the identified healthy disk(s) for rebuilding the data.

In response to determining that there is an insufficient amount of available free space on the healthy disk(s) for rebuilding data on the failed/failing disk, the parity module 304 can effectively widen and/or increase the width of a data stripe to create and/or free-up space for rebuilding the data on the failed/failing disk. Effectively widening and/or increasing the width of a data stripe, in some embodiments, may result from merging the parity data of two data stripes, which can free-up/create space in a disk that is currently storing parity data for one or the data stripes.

A parity calculation module 306, in various further embodiments, can calculate a new P parity data for one or more data stripes based on parity data for the data stripe(s). In some embodiments, a parity calculation module 306 can generate a new P parity data ($P_{new}$) in a RAID or DRAID configuration based on and/or using a first P parity data (P1) for a first data stripe and a second P parity data (P2) for a second data stripe in the RAID or DRAID configuration. That is, the new P parity data $P_{new}$ is the merged P parity data for multiple (e.g., two or more) data stripes in the RAID or DRAID configuration.

In further embodiments, a parity calculation module 306 can generate a new Q parity data ($Q_{new}$) in a RAID or DRAID configuration based on and/or using a first Q parity data (Q1) for the first data stripe and a second Q parity data (Q2) for the second data stripe in the RAID or DRAID configuration. That is, the new Q parity data $Q_{new}$ is the merged Q parity data for the multiple data stripes (e.g., the first data stripe, the second data stripe, etc.) in the RAID or DRAID configuration.

In some embodiments, the new P parity data $P_{new}$ and the new Q parity data $Q_{new}$ may be calculated for a plurality of data stripes using the following equations:

$$D(x) = D_0 + D_1 x + \ldots + D_{n-1} x^{n-1}. \text{ Then,}$$

$$P = D(1) = D_0 \oplus D_1 \oplus \ldots \oplus D_{n-1}$$

$$Q = D(\alpha) = D_0 \oplus D_1 \cdot \alpha \oplus \ldots \oplus D_{n-1} \cdot \alpha^{n-1}$$
$$= ((\ldots(D_{n-1} \cdot \alpha \oplus D_{n-2}) \cdot \alpha \oplus \ldots \oplus D_1 \cdot \alpha) \oplus D_0$$

Here, the data (e.g., $D_0, D_1, \ldots D_n$) are chunks of data of at least two data stripes (e.g., adjacent and/or proximate data stripes) stored on respective disks of a RAID configuration or DRAID configuration. In this manner, a data stripe can be considered to include a greater width. In other words, the new P parity data $P_{new}$ and the new Q parity data $Q_{new}$ can effectively widen or increase the width of a data stripe. Alternatively, or additionally, the new P parity data $P_{new}$ and the new Q parity data $Q_{new}$ can be considered to effectively merge multiple data stripes (e.g., create a new wider/larger data stripe by combining two previous smaller/narrower data stripes).

In other embodiments, the new P parity data $P_{new}$ may be calculated based on the parity data P1 and the parity data P2. Likewise, the new Q parity data $Q_{new}$ may be calculated based on the parity data Q1 and the parity data Q2. These embodiments can reduce the read operations on the D* sectors because the calculations are being performed using parity sectors (e.g., P parity data and Q parity data) instead of data sectors (e.g., data $D_0$-$D_2$), which reduces the impact on performance of application I/O operations.

In the various embodiments, the P parity data $P_{new}$ and the new Q parity data $Q_{new}$ based on P1 and P2 and Q1 and Q2, respectively, may be calculated using any suitable mathematical XOR calculation or combination of XOR calculations that are known or developed in the future. In some embodiments, the P parity data $P_{new}$ may be calculated by XORing the P parity data P1 and the P parity data P2 and the Q parity data $Q_{new}$ may be calculated using one or more polynomial functions of weighted XOR operations of older Q parity data for the data stripes (e.g., older Q1s and older Q2s).

A parity module 304, in further additional embodiments, can replace and/or write over parity data for a data stripe with newly calculated parity data. In some embodiments, a parity module 304 can replace P parity data (e.g., P parity data P1 or P parity data P2) with a new P parity data (e.g., P parity data $P_{new}$) for the P parity data P1 and P parity data P2. That is, the new P parity data $P_{new}$ replaces and/or is written over the P parity data P1 or the P parity data P2 on one of the disks in the RAID or DRAID configuration storing the first data stripe or the second data stripe, respectively. For example, if a disk failure is detected on the first data stripe, the newly calculated P parity data $P_{new}$ will replace and/or be written over the P parity data P1 on the disk of the first data stripe, which effectively widens and/or increases the width of the first data stripe. Similarly, if a disk failure is detected on the second data stripe, the newly calculated P parity data $P_{new}$ will replace and/or be written over the P parity data P2 on the disk of the second data stripe, which effectively widens and/or increases the width of the second data stripe.

In additional or alternative embodiments, a parity module 304 can replace Q parity data (e.g., Q parity data Q1 or Q parity data Q2) with a new Q parity data (e.g., Q parity data $Q_{new}$) for the Q parity data Q1 and Q parity data Q2. That is, the new Q parity data $Q_{new}$ replaces and/or is written over the Q parity data Q1 or the Q parity data Q2 on one of the disks in the RAID or DRAID configuration storing the first data stripe or the second data stripe, respectively. For example, if a disk failure is detected on the first data stripe, the newly calculated Q parity data $Q_{new}$ will replace and/or be written over the Q parity data Q1 on the disk of the first data stripe, which effectively widens and/or increases the width of the first data stripe. Similarly, if a disk failure is detected on the second data stripe, the newly calculated Q parity data $Q_{new}$ will replace and/or be written over the Q parity data Q2 on the disk of the second data stripe, which effectively widens and/or increases the width of the second data stripe.

A parity module 304, in further embodiments, can replace and/or write over parity data for a data stripe with rebuild data for the detected failed or failing disk. In other words, a parity module 304 can create free space and/or spare space for rebuilding data on a disk for a data stripe previously storing parity data. In some embodiments, a parity module 304 can delete P parity data (e.g., P parity data P1 or P parity data P2) on a disk of a data stripe to create/free storage space for rebuilding the data on the failed/failing disk. That is, the P parity data (e.g., P parity data P1 or the P parity data P2) is deleted to create data rebuild space on one of the disks in the RAID or DRAID configuration. For example, if a disk failure is detected on the first data stripe, the P parity data P2 on the disk of the second data stripe will be delete to free-up and/or create space on the disk of the second data stripe to rebuild the data on the failed/failing disk of the first data stripe. Similarly, if a disk failure is detected on the second data stripe, the P parity data P1 on the disk of the first data stripe will be delete to free-up and/or create space on the disk of the first data stripe to rebuild the data on the failed/failing disk of the second data stripe.

In additional or alternative embodiments, a parity module 304 can delete Q parity data (e.g., Q parity data Q1 or Q parity data Q2) on a disk of a data stripe to create/free storage space for rebuilding the data on the failed/failing disk. That is, the Q parity data (e.g., Q parity data Q1 or the Q parity data Q2) is deleted to create data rebuild space on one of the disks in the RAID or DRAID configuration. For example, if a disk failure is detected on the first data stripe, the Q parity data Q2 on the disk of the second data stripe will be delete to free-up and/or create space on the disk of the second data stripe to rebuild the data on the failed/failing disk of the first data stripe. Similarly, if a disk failure is detected on the second data stripe, the Q parity data Q1 on the disk of the first data stripe will be delete to free-up and/or create space on the disk of the first data stripe to rebuild the data on the failed/failing disk of the second data stripe.

Figure 3B:
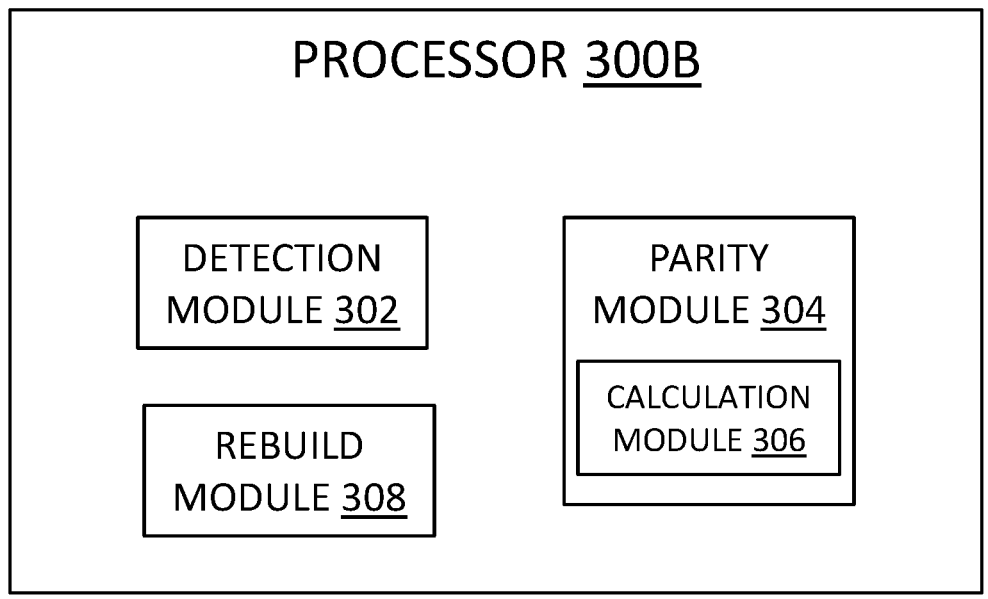

Referring to FIG. 3B, FIG. 3B is a block diagram of one embodiment of a processor 300B that can be included in and/or as a portion of a storage engine 206. At least in the illustrated embodiment, a processor 300B may include, among other components, a detection module 302 and a parity module 304 including the parity calculation module 306 coupled to and/or in communication with one another similar to the various embodiments of processor 300A discussed above with reference to FIG. 3A. In addition, a processor 300B can further include a rebuild module 308 coupled to and/or in communication with the detection module 302 and the parity module 304.

A rebuild module 308 may include any suitable hardware and/or software that can rebuild data on a failed and/or failing disk. A rebuild module 308 may rebuild the data on the failed/failed disk utilizing any suitable rebuild technique and/or method that is known or developed in the future.

In some embodiments, the rebuild module 308 can utilize the space on a disk that is created and/or freed-up by the parity module 304. That is, the rebuild module can use parity data (e.g., P parity data P1, P parity data P2, P parity data $P_{new}$, Q parity data Q1, Q parity data Q2, and/or Q parity data $Q_{new}$) to rebuild the data for the failed/failing disk on the disk of the first data stripe or second data stripe including space freed-up/created by the parity module 304.

Figure 4:
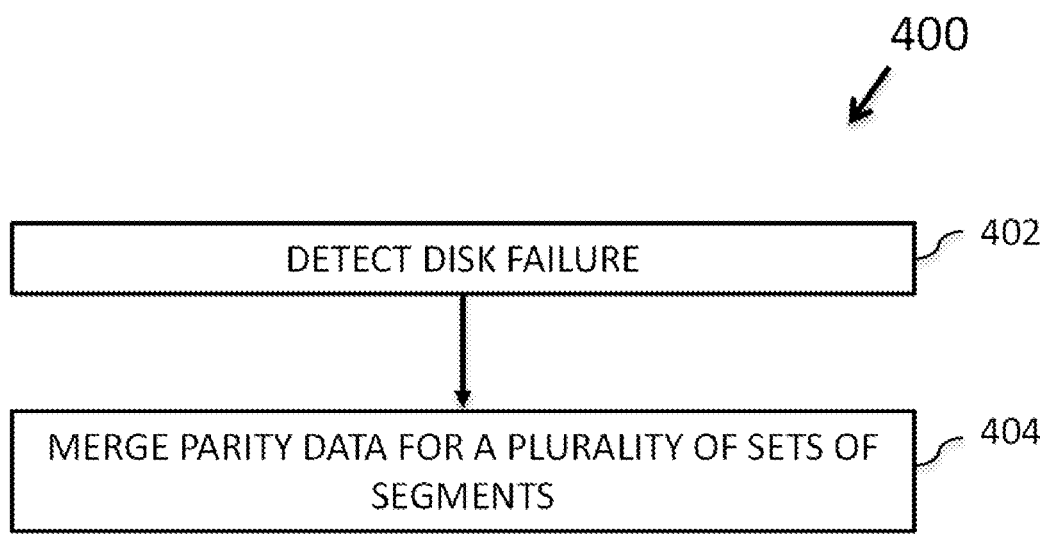
FIG. 4 is a schematic flow chart diagram illustrating one embodiment of a method for dynamically merging parity data for a plurality of data stripes.

Referring to FIG. 4, FIG. 4 is a schematic flow chart diagram illustrating one embodiment of a method 400 for dynamically merging parity data for a plurality of data stripes. At least in the illustrated embodiment, method 400 can begin by a processor (e.g., processor 300A, processor 300B, etc.) detecting a disk failure in RAID or DRAID configuration (block 402). In response to detecting the disk failure, the processor merges parity data stored in a plurality of sets of segments in a stripe of the RAID configuration to free space in a set of parity segments of the plurality of sets of segments (block 404).

In some embodiments, merging the parity data includes writing first parity data in a first set of parity segments to a second set of parity segments including second parity data to free the space in the first set of parity segments. In other embodiments, merging the parity data includes writing the second parity data in the second set of parity segments to the first set of parity segments including the first parity data to free the space in the second set of parity segments.

In further embodiments, writing the second parity data includes writing the second parity data to the first set of segments in response to a first disk failure in a first set of disks associated with the first set of segments storing the first parity data. In further additional or alternative embodiments, writing the first parity data includes writing the first parity data to the second set of segments in response to a second disk failure in a second set of disks associated with the second set of segments storing the second parity data.

The first set of segments, in some embodiments, includes a first segment and/or a second segment. Here, the first segment stores a first P parity data, the second segment stores a first Q parity data, the second set of segments includes a third segment and/or a fourth segment, the third segment stores a second P parity data, and the fourth segment stores a second Q parity data.

In various embodiments, merging the parity data further includes calculating a new P parity data and a new Q parity data. In some embodiments, the calculated new P parity data is based on the first P parity data and the calculated new Q parity data is based on the first Q parity in response to the second disk failure in the second set of disks. In further embodiments, the calculated new P parity data is based on the second P parity data and the calculated new Q parity data is based on the second Q parity in response to the first disk failure in the first set of disks.

In further embodiments, writing the first parity data includes writing the calculated new P parity data and the calculated new Q parity data to the second set of segments. In yet further embodiments, writing the second parity data comprises writing the calculated new P parity data and the calculated new Q parity data to the first set of segments.

In some embodiments, merging the parity data includes calculating a new P parity data for P parity data stored in a first set of parity segments in the plurality of sets of segments, calculating a new Q parity data for a parity data stored in the first set of parity segments, and writing the new P parity data and the new Q parity data to a second set of parity segments in the plurality of sets of segments, and calculating the new P parity and the new Q parity comprises utilizing a bitwise addition modulo-2 function to calculate the new P parity and the new Q parity. In other embodiments, merging the parity data includes calculating a new P parity data for P parity data stored in a first set of parity segments in the plurality of sets of segments, calculating a new Q parity data for a parity data stored in the first set of parity segments, and writing the new P parity data and the new Q parity data to a second set of parity segments in the plurality of sets of segments, calculating the new P parity comprises utilizing a bitwise addition modulo-2 function to calculate the new P parity, and calculating the new Q parity comprises utilizing polynomial functions of weighted XOR operations of older Q parity data (e.g., older $Q1s$ and $Q2s$) to calculate the new Q parity.

Figure 5:
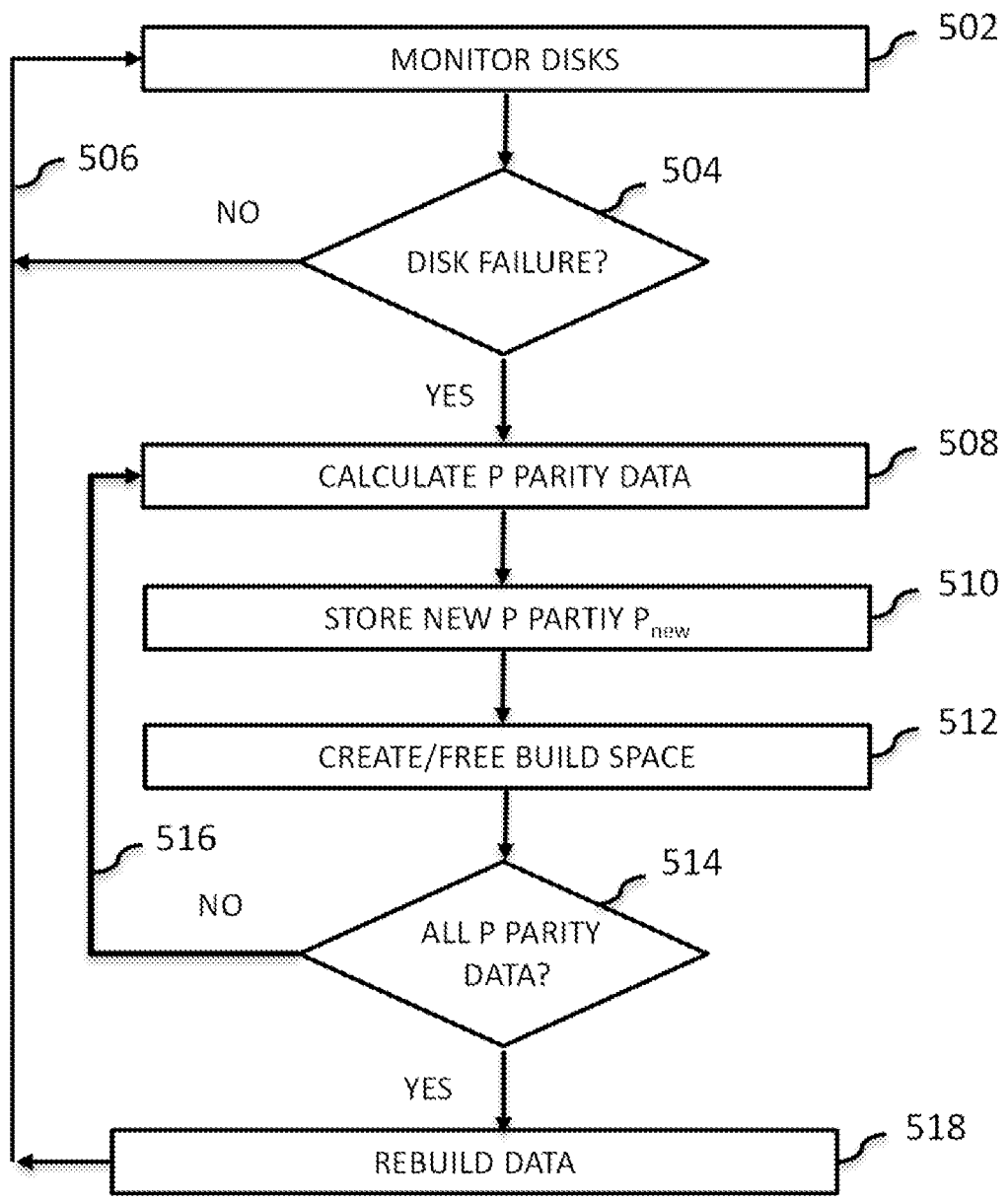
FIG. 5 is a schematic flow chart diagram illustrating another embodiment of a method for dynamically merging parity data for a plurality of data stripes

FIG. 5 is a schematic flow chart diagram illustrating another embodiment of a method 500 for dynamically merging parity data for a plurality of data stripes. At least in the illustrated embodiment, method 500 can begin by a processor (e.g., processor 300A, processor 300B, etc.) monitoring the disks of a RAID/DRAID configuration to determine if a disk in a RAID/DRAID configuration has failed and/or is failing (block 502). In response to the disks all being healthy (e.g., a "NO" in block 502), the processor continues to monitor the disks (return 504).

In response to detecting a disk failure (e.g., a "YES" in block 502), the processor can calculate a new P parity data $P_{new}$ based on the P parity P1 for data of a first data stripe and the P parity P2 for data of a second data stripe (block 506). The processor can store the new P parity $P_{new}$ on the disk storing the P parity P1 or the P parity P2 (block 508), which can be in the same data stripe or the other data stripe as the failed/failing disk.

The processor can further free space the other disk storing P parity data that did not have the new P Parity data $P_{new}$ written to it so that the data on the failed/failing disk can be written thereon (block 510). Next, the processor can determine if all of the P parity data for the data stripes have been properly calculated (block 512).

In response to determining that one or more P parity data has not been calculated (e.g., a "NO" in block 512), the processor calculates the remaining P Parity data in block 506 (return 514). In response to determining that all of the P parity data has been calculated (e.g., a "YES" in block 514), the processor rebuilds the data of the failed/failing disk in the rebuild space (block 516) and continues to monitor the disks (return 504).

Figure 6:
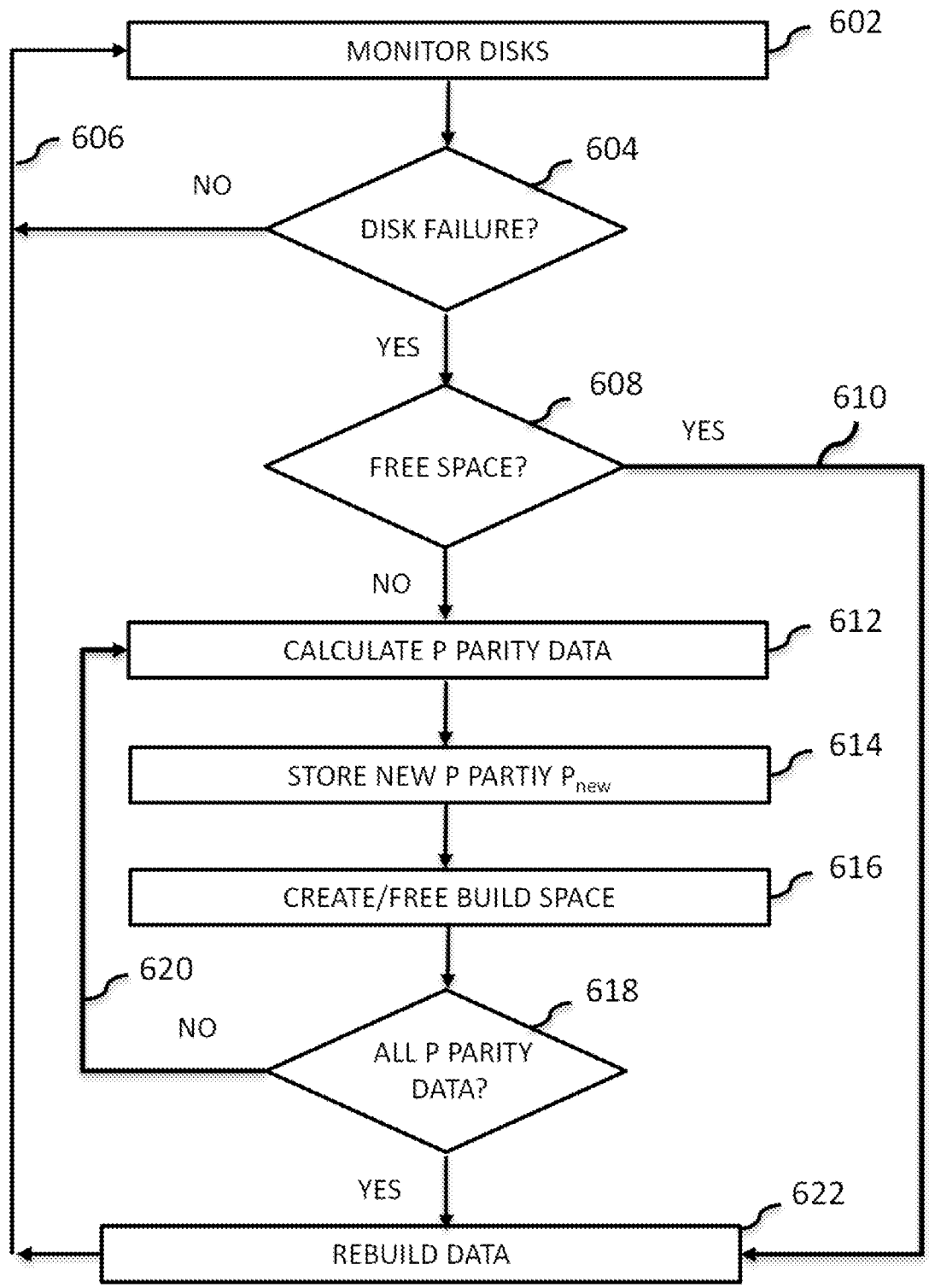
FIG. 6 is a schematic flow chart diagram illustrating yet another embodiment of a method for dynamically merging parity data for a plurality of data stripes.

FIG. 6 is a schematic flow chart diagram illustrating another embodiment of a method 600 for dynamically merging parity data for a plurality of data stripes. At least in the illustrated embodiment, method 600 can begin by a processor (e.g., processor 300A, processor 300B, etc.) monitoring the disks of a RAID/DRAID configuration to determine if a disk in a RAID/DRAID configuration has failed and/or is failing (block 602). In response to the disks all being healthy (e.g., a "NO" in block 602), the processor continues to monitor the disks (return 604).

In response to detecting a disk failure (e.g., a "YES" in block 602), the processor can determine if there is a spare disk and/or available rebuild space in the RAID/DRAID configuration (block 606). In response to determining that there is a spare disk and/or available rebuild space in the RAID/DRAID configuration (e.g., a "YES" in block 606), the processor can utilize the spare disk and/or available rebuild space to rebuild the data in the failed/failing disk (block 608) and the processor returns to monitoring the disks (return 604).

In response to determining that there is no spare disk and/or rebuild space in the RAID/DRAID configuration (e.g., a "NO" in block 606), the processor can calculate a new P parity data $P_{new}$ based on the P parity P1 for data of a first data stripe and the P parity P2 for data of a second data stripe (block 610). The processor can store the new P parity $P_{new}$ on the disk storing the P parity P1 or the P parity P2 (block 612), which can be in the same data stripe or the other data stripe as the failed/failing disk.

The processor can further free space the other disk storing P parity data that did not have the new P Parity data $P_{new}$ written to it so that the data on the failed/failing disk can be written and/or rebuilt thereon (block 614). Next, the processor can determine if all of the P parity data for the data stripes have been properly calculated (block 616).

In response to determining that one or more P parity data has not been calculated (e.g., a "NO" in block 616), the processor calculates the remaining P Parity data in block 610 (return 618). In response to determining that all of the P parity data has been calculated (e.g., a "YES" in block 616), the processor rebuilds the data of the failed/failing disk in the rebuild space (block 620) and continues to monitor the disks (return 604).

Figure 7:
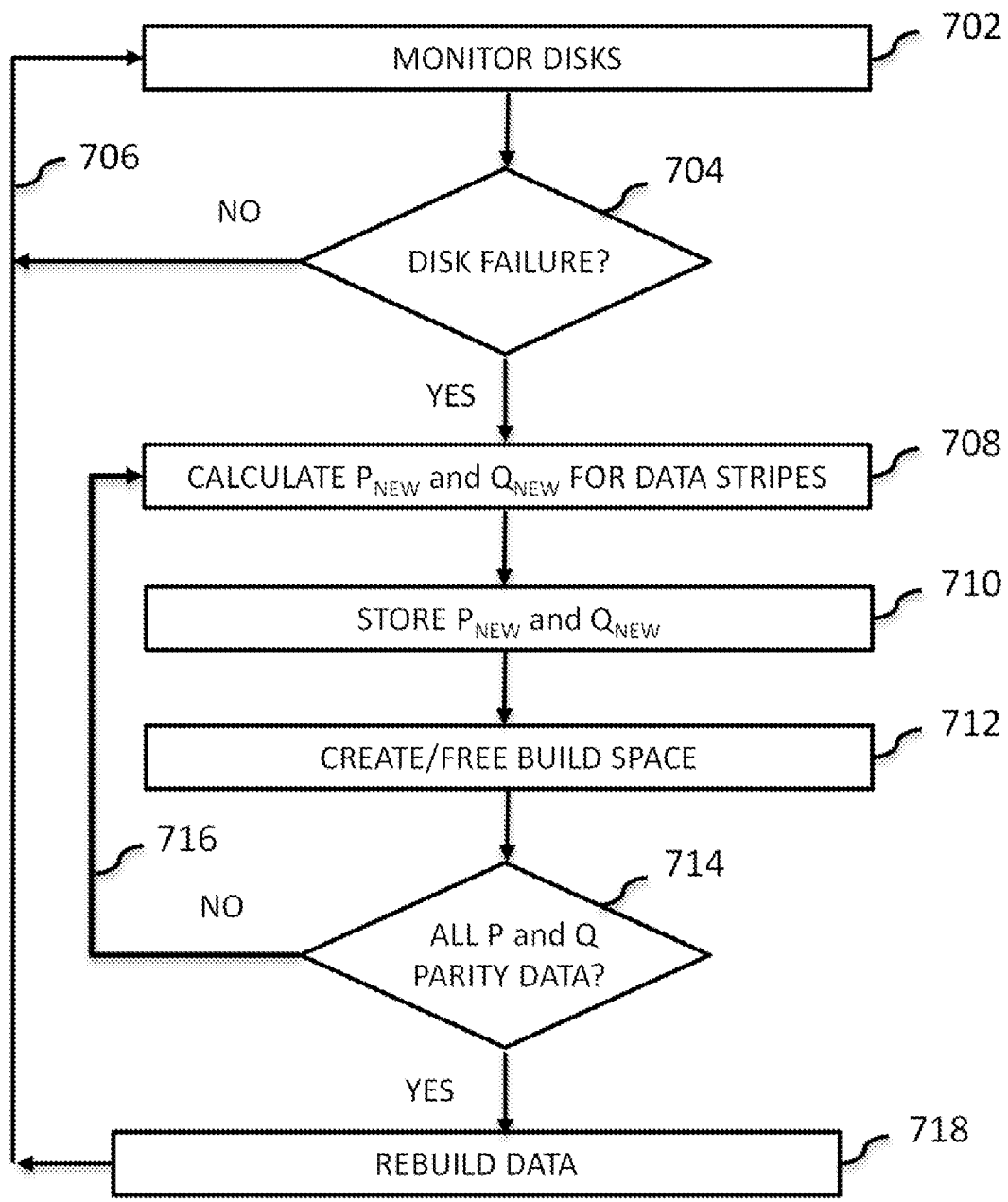
FIG. 7 is a schematic flow chart diagram illustrating still another embodiment of a method for dynamically merging parity data for a plurality of data stripes.

FIG. 7 is a schematic flow chart diagram illustrating another embodiment of a method 700 for dynamically merging parity data for a plurality of data stripes. At least in the illustrated embodiment, method 700 can begin by a processor (e.g., processor 300A, processor 300B, etc.) monitoring the disks of a RAID/DRAID configuration to determine if a disk in a RAID/DRAID configuration has failed and/or is failing (block 702). In response to the disks all being healthy (e.g., a "NO" in block 702), the processor continues to monitor the disks (return 704).

In response to detecting a disk failure (e.g., a "YES" in block 702), the processor can calculate a new P parity data $P_{new}$ and a new Q parity data $Q_{new}$ based on the data (e.g., $D_0$-$D_2$) of a first data stripe and the data (e.g., $D_0$-$D_2$) of a second data stripe (block 706). The processor can store the new P parity $P_{new}$ on the disk storing the P parity P1 for the first data stripe or the P parity P2 for the second data stripe and store the new Q parity $Q_{new}$ on the disk storing the Q parity Q1 for the first data stripe or the Q parity Q2 for the second data stripe (block 708), which can be in the same data stripe or the other data stripe as the failed/failing disk.

The processor can further free space on the other disk storing P parity data that did not have the new P Parity data $P_{new}$ written to it and free space on the other disk storing Q parity data that did not have the new Q Parity data $Q_{new}$ written to it so that the data on the failed/failing disk can be written and/or rebuilt thereon (block 710). Next, the processor can determine if all of the P parity data and/or Q parity data for the data stripes have been properly calculated (block 712).

In response to determining that one or more P parity data and/or one or more Q parity data has not been calculated (e.g., a "NO" in block 712), the processor calculates the remaining P Parity data and/or Q parity data (return 714). In response to determining that all of the P parity data and Q parity data has been calculated (e.g., a "YES" in block 712), the processor rebuilds the data of the failed/failing disk in the rebuild space on the disk(s) (block 716) and continues to monitor the disks (return 704).

Figure 8:
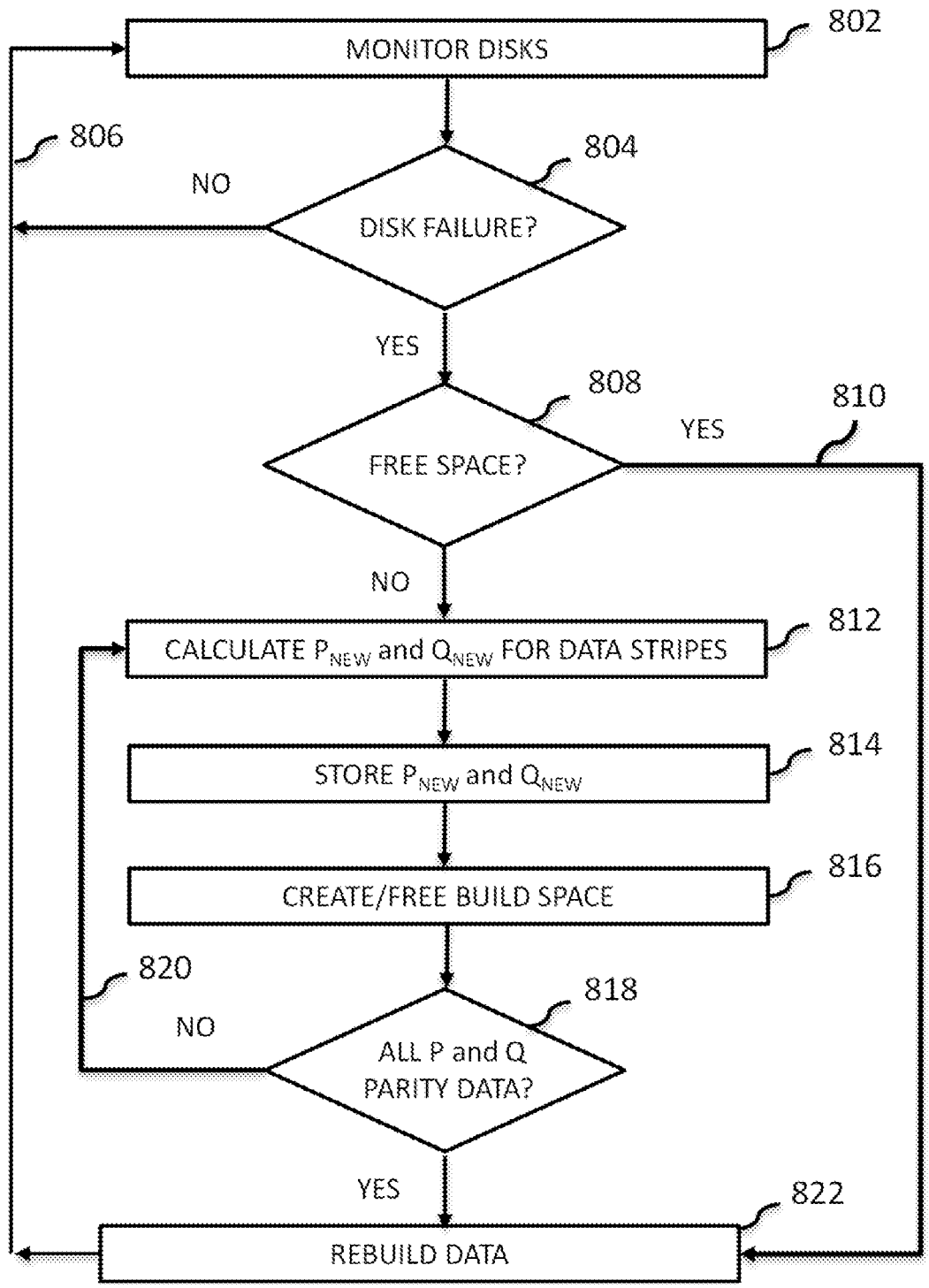
FIG. 8 is a schematic flow chart diagram illustrating another embodiment of a method for dynamically merging parity data for a plurality of data stripes

FIG. 8 is a schematic flow chart diagram illustrating another embodiment of a method 800 for dynamically merging parity data for a plurality of data stripes. At least in the illustrated embodiment, method 800 can begin by a processor (e.g., processor 300A, processor 300B, etc.) monitoring the disks of a RAID/DRAID configuration to determine if a disk in a RAID/DRAID configuration has failed and/or is failing (block 802). In response to the disks all being healthy (e.g., a "NO" in block 802), the processor continues to monitor the disks (return 804).

In response to detecting a disk failure (e.g., a "YES" in block 802), the processor can determine if there is a spare disk and/or available rebuild space in the RAID/DRAID configuration (block 806). In response to determining that there is a spare disk and/or available rebuild space in the RAID/DRAID configuration (e.g., a "YES" in block 806), the processor can utilize the spare disk and/or available rebuild space to rebuild the data in the failed/failing disk (block 808) and the processor returns to monitoring the disks (return 804).

In response to determining that there is no spare disk and/or rebuild space in the RAID/DRAID configuration (e.g., a "NO" in block 806), the processor can calculate a new P parity data $P_{new}$ and a new Q parity data $Q_{new}$ based on the data (e.g., $D_0$-$D_2$) of a first data stripe and the data (e.g., $D_0$-$D_2$) of a second data stripe (block 810). The processor can store the new P parity $P_{new}$ on the disk storing the P parity P1 for the first data stripe or the P parity P2 for the second data stripe and store the new Q parity $Q_{new}$ on the disk storing the Q parity Q1 for the first data stripe or the Q parity Q2 for the second data stripe (block 812), which can be in the same data stripe or the other data stripe as the failed/failing disk.

The processor can further free space on the other disk storing P parity data that did not have the new P Parity data $P_{new}$ written to it and free space on the other disk storing Q parity data that did not have the new Q Parity data $Q_{new}$ written to it so that the data on the failed/failing disk can be written and/or rebuilt thereon (block 814). Next, the processor can determine if all of the P parity data and/or Q parity data for the data stripes have been properly calculated (block 816).

In response to determining that one or more P parity data and/or one or more Q parity data has not been calculated (e.g., a "NO" in block 816), the processor calculates the remaining P Parity data and/or Q parity data (return 818). In response to determining that all of the P parity data and Q parity data has been calculated (e.g., a "YES" in block 816), the processor rebuilds the data of the failed/failing disk in the rebuild space on the disk(s) (block 820) and continues to monitor the disks (return 804).

Figure 9:
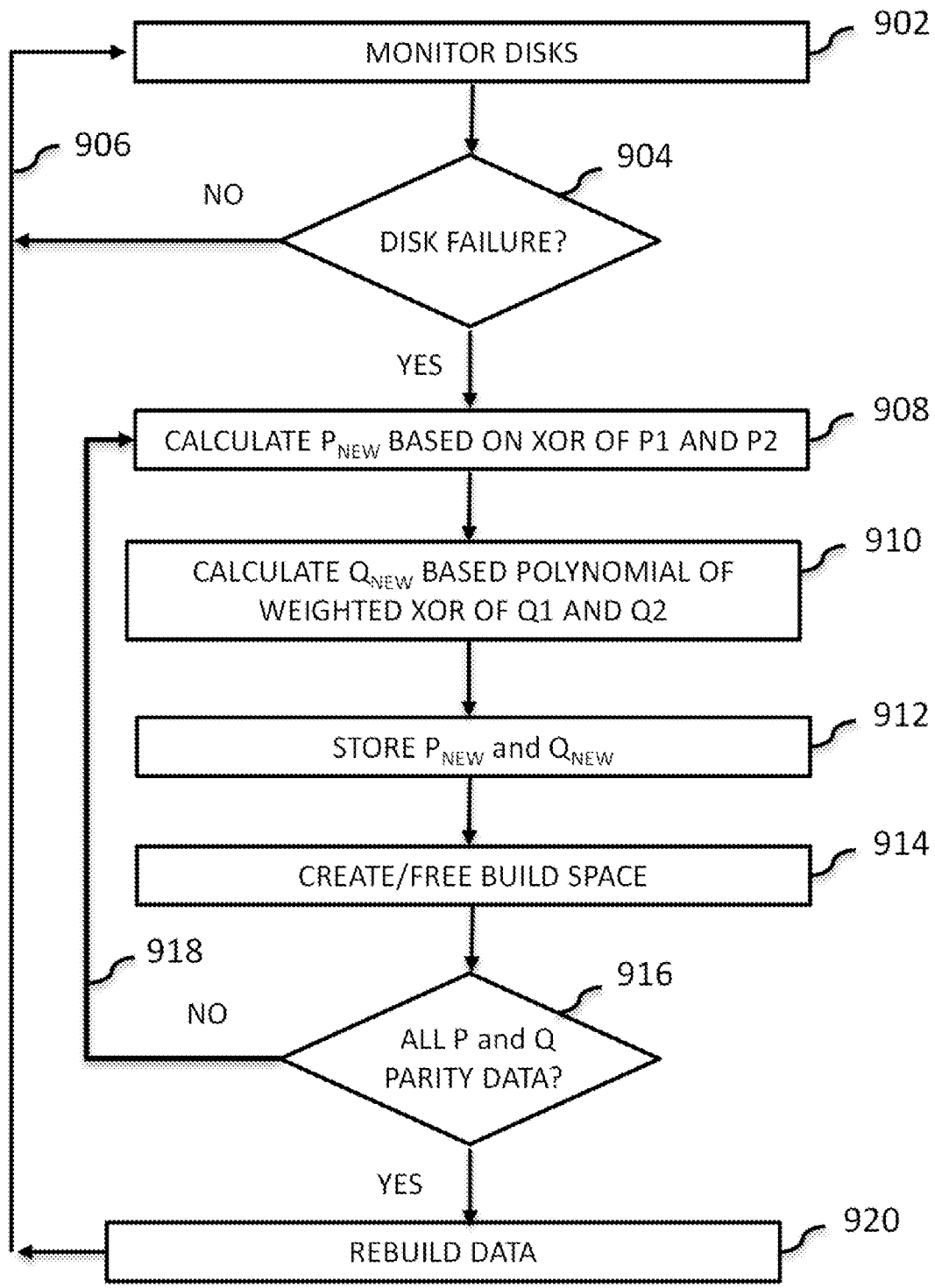
FIG. 9 is a schematic flow chart diagram illustrating yet another embodiment of a method for dynamically merging parity data for a plurality of data stripes.

FIG. 9 is a schematic flow chart diagram illustrating another embodiment of a method 700 for dynamically merging parity data for a plurality of data stripes. At least in the illustrated embodiment, method 900 can begin by a processor (e.g., processor 300A, processor 300B, etc.) monitoring the disks of a RAID/DRAID configuration to determine if a disk in a RAID/DRAID configuration has failed and/or is failing (block 902). In response to the disks all being healthy (e.g., a "NO" in block 902), the processor continues to monitor the disks (return 904).

In response to detecting a disk failure (e.g., a "YES" in block 902), the processor can calculate a new P parity data $P_{new}$ based on an XOR calculation of the P parity data P1 of the data stripe and the P parity data P2 of the second data stripe (block 906). The processor further calculates a new Q parity data $Q_{new}$ based on polynomial functions of weighted XOR operations of older Q parity data for the first and second data stripes (e.g., older Q1s and older Q2s) (block 908). The processor can store the new P parity $P_{new}$ on the disk storing the P parity P1 for the first data stripe or the P parity P2 for the second data stripe and store the new Q parity $Q_{new}$ on the disk storing the Q parity Q1 for the first data stripe or the Q parity Q2 for the second data stripe (block 910), which can be in the same data stripe or the other data stripe as the failed/failing disk.

The processor can further free space on the other disk storing P parity data that did not have the new P Parity data $P_{new}$ written to it and free space on the other disk storing Q parity data that did not have the new Q Parity data $Q_{new}$ written to it so that the data on the failed/failing disk can be written and/or rebuilt thereon (block 912). Next, the processor can determine if all of the P parity data and/or Q parity data for the data stripes have been properly calculated (block 914).

In response to determining that one or more P parity data and/or one or more Q parity data has not been calculated (e.g., a "NO" in block 914), the processor calculates the remaining P Parity data and/or Q parity data (return 916). In response to determining that all of the P parity data and Q parity data has been calculated (e.g., a "YES" in block 914), the processor rebuilds the data of the failed/failing disk in the rebuild space on the disk(s) (block 918) and continues to monitor the disks (return 904).

Figure 10:
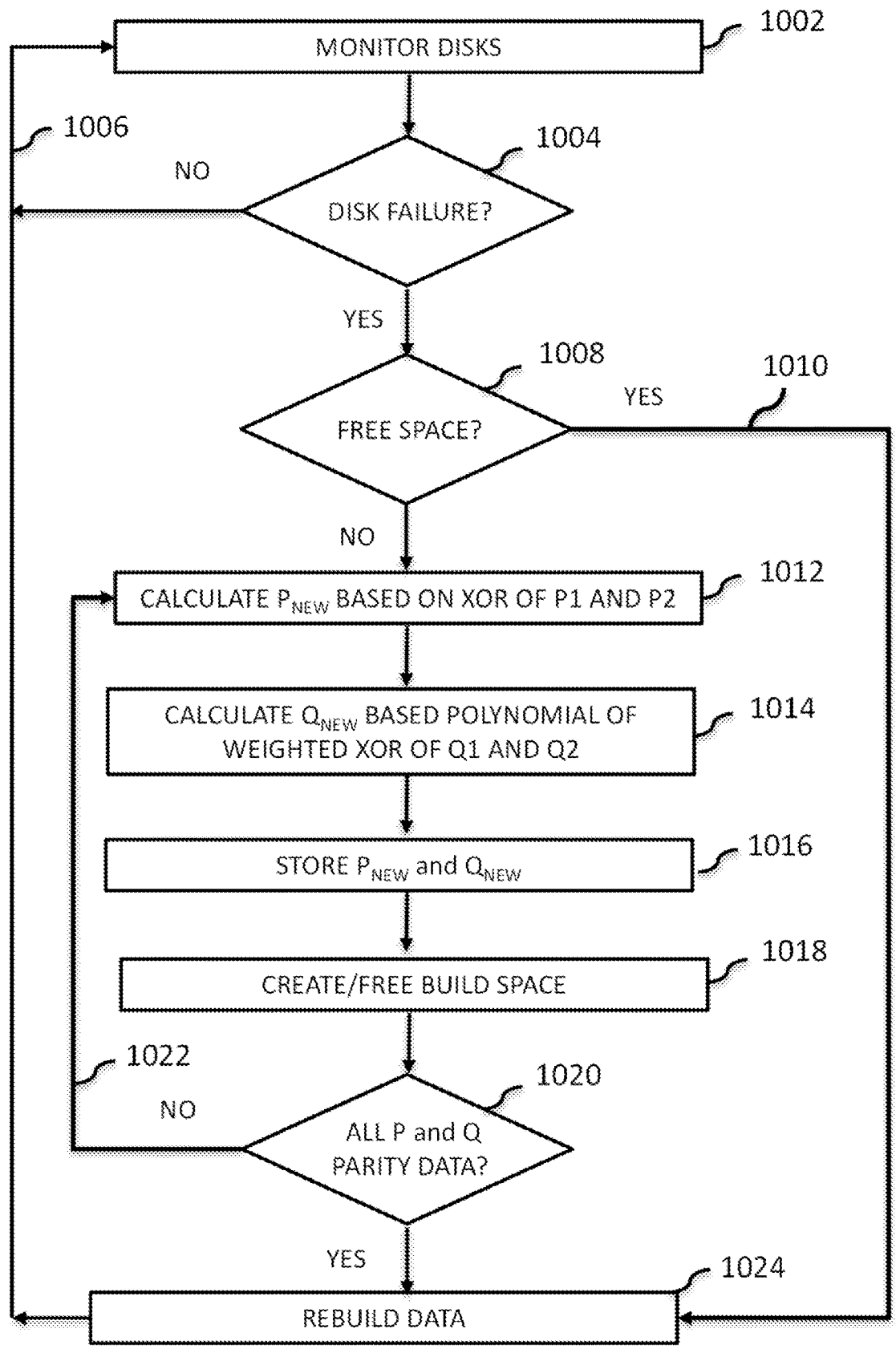
FIG. 10 is a schematic flow chart diagram illustrating still another embodiment of a method for dynamically merging parity data for a plurality of data stripes

FIG. 10 is a schematic flow chart diagram illustrating another embodiment of a method 1000 for dynamically merging parity data for a plurality of data stripes. At least in the illustrated embodiment, method 1000 can begin by a processor (e.g., processor 300A, processor 300B, etc.) monitoring the disks of a RAID/DRAID configuration to determine if a disk in a RAID/DRAID configuration has failed and/or is failing (block 1002). In response to the disks all being healthy (e.g., a "NO" in block 1002), the processor continues to monitor the disks (return 1004).

In response to detecting a disk failure (e.g., a "YES" in block 1002), the processor can determine if there is a spare disk and/or available rebuild space in the RAID/DRAID configuration (block 1006). In response to determining that there is a spare disk and/or available rebuild space in the RAID/DRAID configuration (e.g., a "YES" in block 1006), the processor can utilize the spare disk and/or available rebuild space to rebuild the data in the failed/failing disk (block 1008) and the processor returns to monitoring the disks (return 1004).

In response to determining that there is no spare disk and/or rebuild space in the RAID/DRAID configuration (e.g., a "NO" in block 1006), the processor can calculate a new P parity data $P_{new}$ the processor can calculate a new P parity data $P_{new}$ based on an XOR calculation of the P parity data P1 of the data stripe and the P parity data P2 of the second data stripe (block 1008). The processor further calculates a new Q parity data $Q_{new}$ based on polynomial functions of weighted XOR operations of older Q parity data for the first and second data stripes (e.g., older Q1s and older Q2s) (block 1010).

The processor can store the new P parity $P_{new}$ on the disk storing the P parity P1 for the first data stripe or the P parity P2 for the second data stripe and store the new Q parity $Q_{new}$ on the disk storing the Q parity Q1 for the first data stripe or the Q parity Q2 for the second data stripe (block 1012), which can be in the same data stripe or the other data stripe as the failed/failing disk. The processor can further free space on the other disk storing P parity data that did not have the new P Parity data $P_{new}$ written to it and free space on the other disk storing Q parity data that did not have the new Q Parity data $Q_{new}$ written to it so that the data on the failed/failing disk can be written and/or rebuilt thereon (block 1014).

Next, the processor can determine if all of the P parity data and/or Q parity data for the data stripes have been properly calculated (block 1016). In response to determining that one or more P parity data and/or one or more Q parity data has not been calculated (e.g., a "NO" in block 1016), the processor calculates the remaining P Parity data and/or Q parity data (return 1018). In response to determining that all of the P parity data and Q parity data has been calculated (e.g., a "YES" in block 1016), the processor rebuilds the data of the failed/failing disk in the rebuild space on the disk(s) (block 1020) and continues to monitor the disks (return 1004).

Figure 11A:
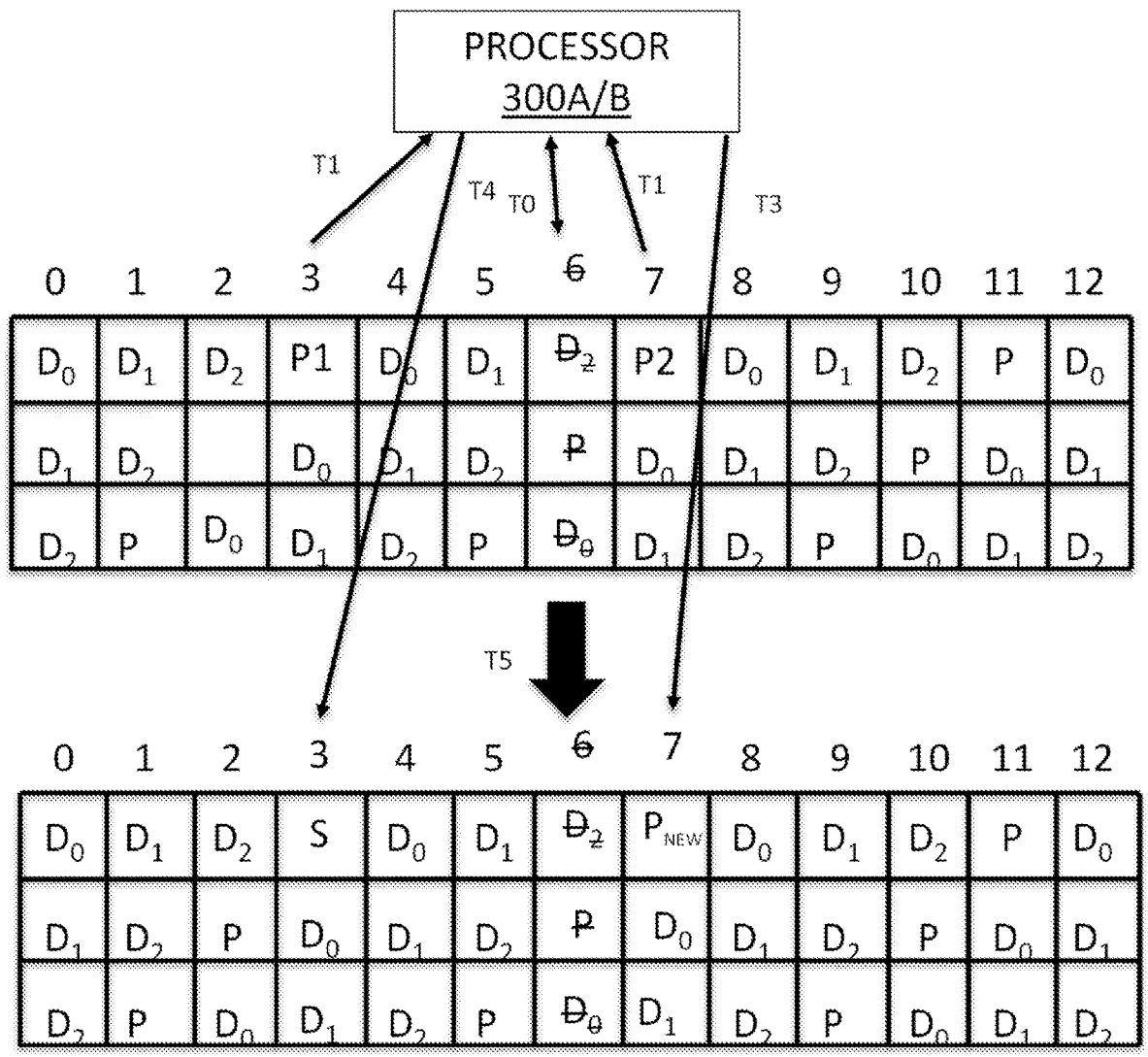
FIGS. 11A and 11B are timing diagrams for various operations of the embodiments shown in FIGS. 1 through 10.
Figure 11B:
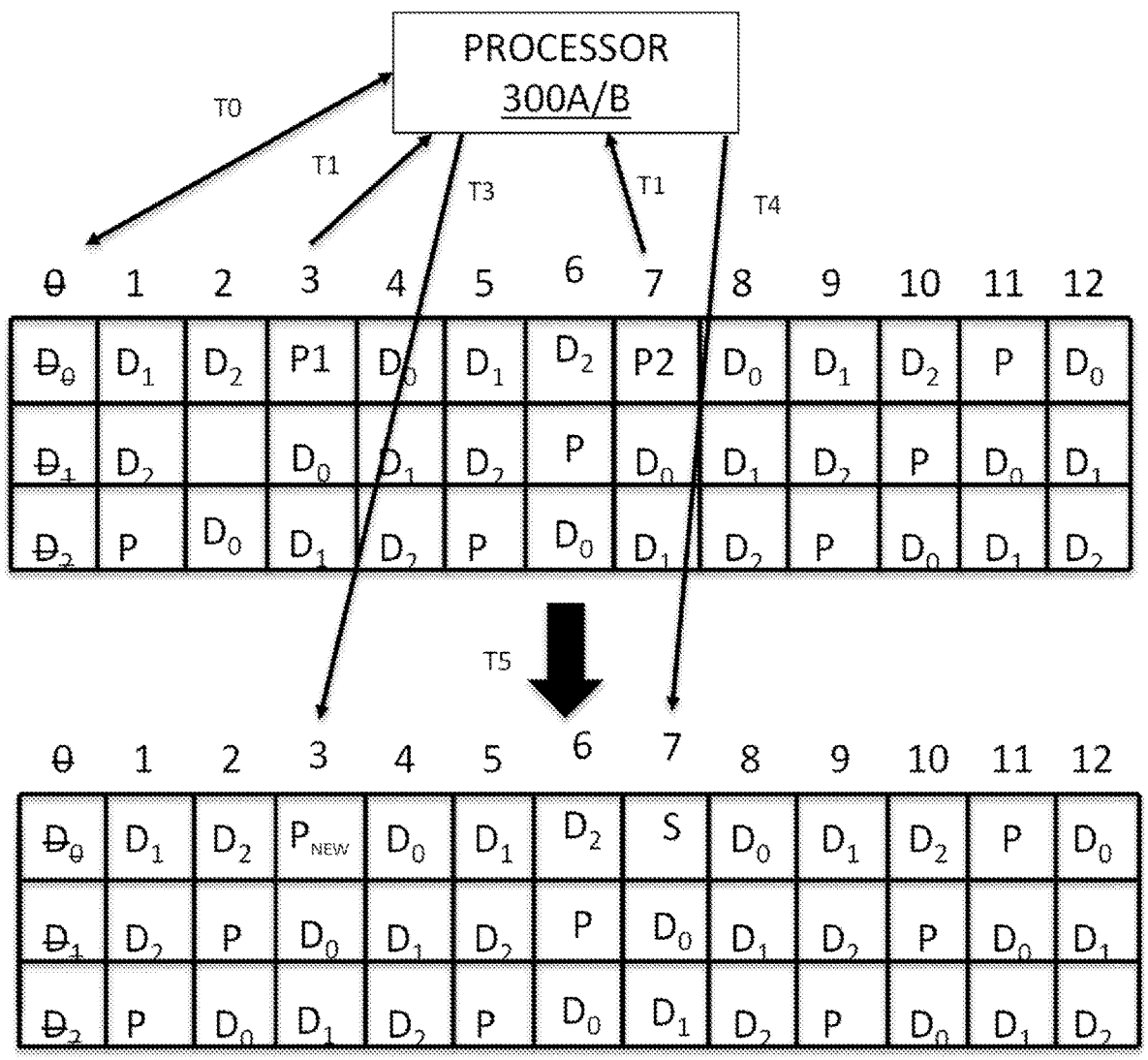

The following non-limiting examples shown in FIGS. 11A and 11B may be helpful in understanding how parity data is merged to effectively widen and/or increase the width of a data stripe to free rebuild space on a disk storing parity data in accordance with various embodiments discussed herein. These examples illustrate a DRAID configuration including thirteen (13) disks (e.g., disks 0-12), although the principles disclosed herein are equally applicable to RAID configurations and to RAID/DRAID configurations including greater than or less than 13 disks.

In the example of FIGS. 11A and 11B, the DRAID configurations store a set of data stripes in a four disk per stripe construction of three data segments and one parity segment (e.g., 3D+P), although other stripe constructions are possible and contemplated herein. That is, a stripe construction may include greater than or less than 3 data segments and a P parity data segment.

As shown in FIG. 11A, a disk 6, which is storing data $D_2$ of a second stripe, has failed or is failing and disks 0-5 and 7-12 are healthy. At time T0, the failure (e.g., failed, failing, offline, etc.) of disk 6 is detected (e.g., by detection module 302). In response to the failure of disk 6, the parity module 304 retrieves and/or collects the P parity data for data segments $D_0$, $D_1$, and $D_2$ stored on disks 0 through 2, respectively, of a first data stripe stored on disk 3 (e.g., P parity data P1) and the P parity data for data segments $D_0$, $D_1$, and $D_2$ stored on disks 4-6, respectively, of a second data stripe stored on disk 7 (e.g., P parity data P2) at time T1.

At time T2, a calculation module 306, calculates a new parity $P_{new}$ for the data $D_0$-$D_2$ stored on disks 0-2 and the data $D_0$-$D_2$ stored on disks 4-6. The calculated new parity $P_{new}$ is the merged parity data for the parity data P1 on disk 3 and the parity data P2 on disk 7. In other words, the calculated new parity $P_{new}$ is a combination of the parity data P1 and the parity data P2.

The parity module 304, at time T3, may then replace (e.g., write over (e.g., delete and write)) the parity data P2 on disk 7 with the new parity $P_{new}$. At time T4, the parity module 304 may delete the parity data P1 from disk 3 to create and/or free up space on disk 3 so that the data $D_2$ stored on failed/failing disk 6 may be rebuilt thereon. In some embodiments, the parity module 304 can perform the operations at times T3 and T4 in parallel (e.g., at the same or substantially the same time) or can reverse the order in which the operations at times T3 and T4 are performed.

One effect of the operations performed at times T0-T4 is to increase the width of the first stripe to include the data stored on disks 0-2 and 4-7, as illustrated at time T5 of FIG. 11A. That is, at time T5, the first stripe is across disks 0-2 and 4-7 and disk 3 now includes free space for rebuilding the data $D_2$ stored on failed/failing disk 6. Further at time T5, a rebuild module 308 can utilize the free space in disk 3 to rebuild the data $D_2$ that was stored on disk 6.

FIG. 11B illustrates another example similar to the example shown in FIG. 11A. In FIG. 11B, a disk 0, which is storing data $D_0$ of a first stripe, has failed or is failing and disks 1-12 are healthy. At time T0, the failure (e.g., failed, failing, offline, etc.) of disk 0 is detected (e.g., by detection module 302). In response to the failure of disk 0, the parity module 304 retrieves and/or collects the P parity data for data segments $D_0$, $D_1$, and $D_2$ stored on disks 0 through 2, respectively, of a first data stripe stored on disk 3 (e.g., parity data P1) and the P parity data for data segments $D_0$, $D_1$, and $D_2$ stored on disks 4-6, respectively, of a second data stripe stored on disk 7 at time T1.

At time T2, a calculation module 306, calculates a new parity $P_{new}$ for the data $D_0$-$D_2$ stored on disks 0-2 and the data $D_0$-$D_2$ stored on disks 4-6 similar to the example discussed above with reference to FIG. 11A. The parity module 304, at time T3, may then replace (e.g., write over (e.g., delete and write)) the P parity data P2 on disk 3 with the new parity $P_{new}$.

The parity module 304, at time T4, may delete the parity data P2 from disk 7 to create and/or free up space on disk 7 so that the data $D_0$ on failed/failing disk 0 may be rebuilt thereon. In some embodiments, the parity module 304 can perform the operations at times T3 and T4 in parallel (e.g., at the same or substantially the same time) or can reverse the order in which the operations at times T3 and T4 are performed.

One effect of the operations performed at times T0-T4 is to increase the width of the second stripe to include the data stored on disks 0-6, as illustrated at time T5 of FIG. 11B. That is, at time T5, the first stripe is across disks 0-6 and disk 7 now includes free space for rebuilding the data $D_0$ on failed/failing disk 0. Further at time T5, a rebuild module 308 can utilize the free space in disk 7 to rebuild the data $D_0$ that was stored on disk 0.

Figure 12A:
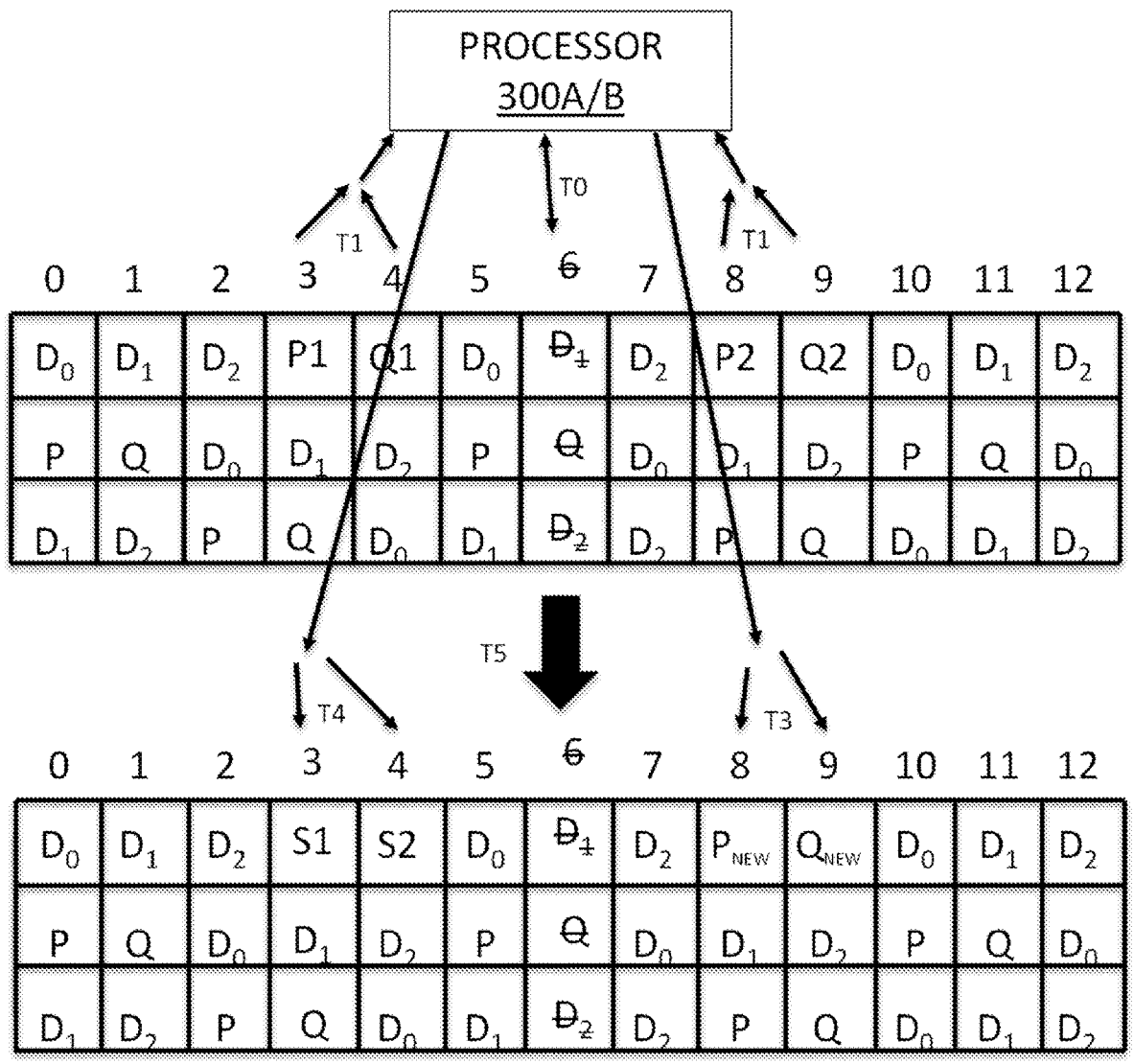
FIGS. 12A and 12B are timing diagrams for various operations of other embodiments shown in FIGS. 1 through 10.
Figure 12B:
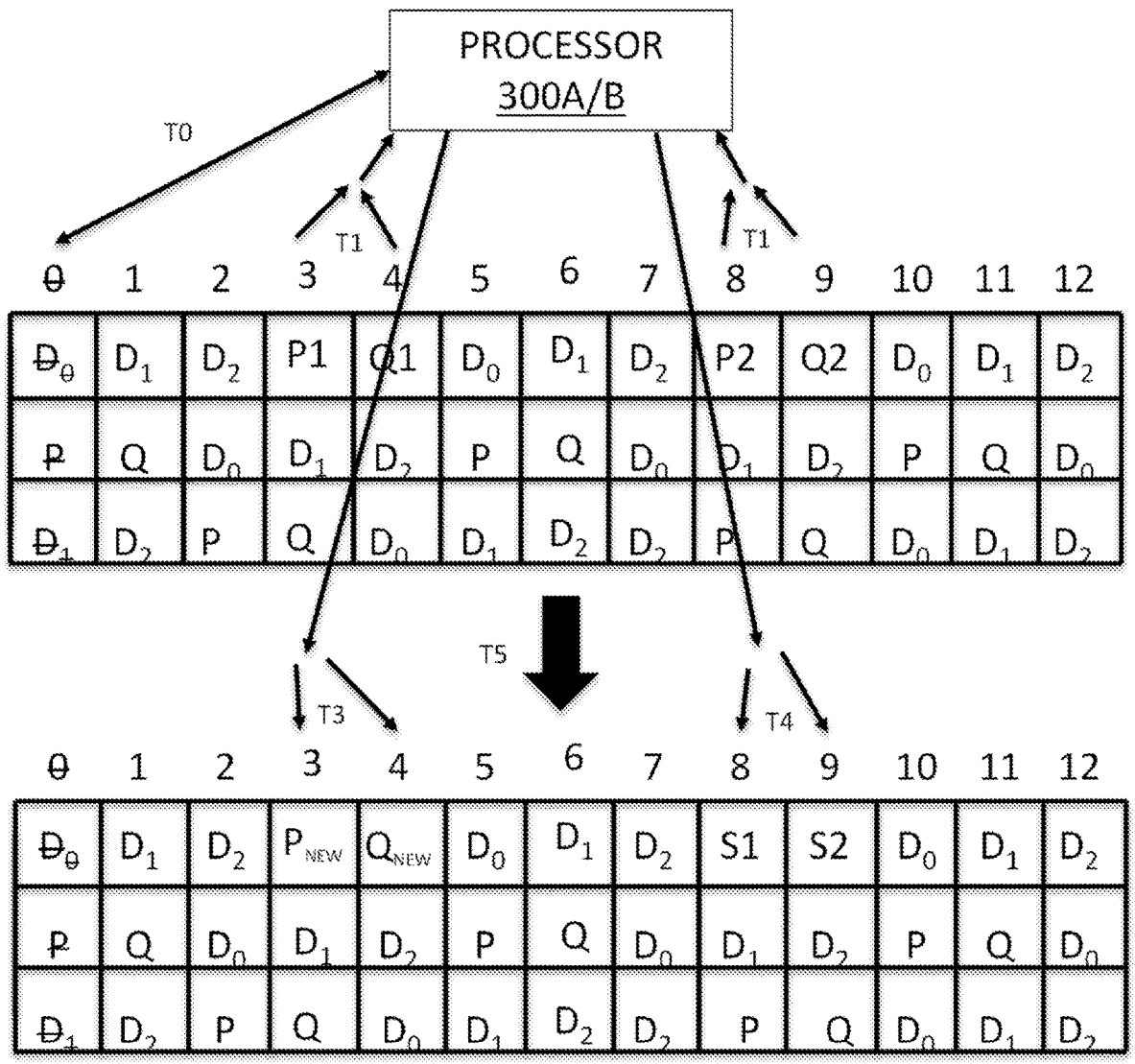

FIGS. 12A and 12B illustrate another non-limiting example that may be helpful in understanding how parity data is merged to effectively widen and/or increase the width of a data stripe to free rebuild space on a disk storing parity data in accordance with various embodiments discussed herein. The examples in FIGS. 12A and 12B illustrate a DRAID configuration including thirteen (13) disks (e.g., disks 0-12), although the principles disclosed herein are equally applicable to RAID configurations and to RAID/DRAID configurations including greater than or less than 13 disks.

In the example of FIGS. 12A and 12B, the DRAID configuration stores a set of data stripes in a five disk per stripe construction of three data segments and two parity segments (e.g., 3D+P+Q), although other stripe constructions are possible and contemplated herein. That is, a stripe construction may include greater than or less than 3 data segments and greater than two parity data segments.

In FIG. 12A, a disk 6, which is storing data $D_1$ of a second stripe, has failed or is failing and disks 0-5 and 7-12 are healthy. At time T0, the failure (e.g., failed, failing, offline, etc.) of disk 6 is detected (e.g., by detection module 302). In response to the failure of disk 6, the parity module 304 retrieves and/or collects the P parity data for data segments $D_0$, $D_1$, and $D_2$ stored on disks 0 through 2, respectively, of a first data stripe stored on disk 3 (e.g., P parity data P1) and the P parity data for data segments $D_0$, $D_1$, and $D_2$ stored on disks 5-7, respectively, of a second data stripe stored on disk 8 (e.g., P parity data P2) at time T1. Further at time T1 and in response to the failure of disk 6, the parity module 304 retrieves and/or collects the Q parity data for data segments $D_0$, $D_1$, and $D_2$ stored on disks 0 through 2 of the first data stripe stored on disk 4 (e.g., Q parity data Q1) and the Q parity data for data segments $D_0$, $D_1$, and $D_2$ stored on disks 5-7, respectively, of a second data stripe stored on disk 9 (e.g., Q parity data Q2).

At time T2, a calculation module 306, calculates a new parity $P_{new}$ for the data $D_0$-$D_2$ stored on disks 0-2 and the data $D_0$-$D_2$ stored on disks 5-7. The calculated new parity $P_{new}$ is the merged parity data for the parity data P1 on disk 3 and the parity data P2 on disk 8. In other words, the calculated new parity $P_{new}$ is a combination of the parity data P1 and the parity data P2.

Further at time T2, the calculation module 306, calculates a new parity $Q_{new}$ for the data $D_0$-$D_2$ stored on disks 0-2 and the data $D_0$-$D_2$ stored on disks 5-7. The calculated new parity $Q_{new}$ is the merged parity data for the parity data Q1 on disk 4 and the parity data Q2 on disk 9. In other words, the calculated new parity $Q_{new}$ is a combination of the parity data Q1 and the parity data Q2.

The parity module 304, at time T3, may then replace (e.g., write over (e.g., delete and write)) the parity data P2 on disk 8 with the new parity $P_{new}$ and replace (e.g., write over (e.g., delete and write)) the parity data Q2 on disk 9 with the new parity $Q_{new}$. At time T4, the parity module 304 may delete the parity data P1 from disk 3 to create and/or free up space on disk 3 so that the data $D_1$ stored on failed/failing disk 6 may be rebuilt thereon.

Further at time T4, the parity module 304 may delete the parity data Q1 from disk 4 to create and/or free up space on disk 4 so that the data $D_1$ stored on failed/failing disk 6 may also be rebuilt thereon. In some embodiments, the parity module 304 can perform the operations at times T3 and T4 in parallel (e.g., at the same or substantially the same time) or can reverse the order in which the operations at times T3 and T4 are performed.

One effect of the operations performed at times T0-T4 is to increase the width of the first stripe to include the data stored on disks 0-2 and 5-9, as illustrated at time T5 of FIG. 11A. That is, at time T5, the first stripe is across disks 0-2 and 5-9 and disks 3 and 4 now include free space for rebuilding the data $D_1$ stored on failed/failing disk 6. Further at time T5, a rebuild module 308 can utilize the free space in disks 3 and 4 to rebuild the data $D_1$ that was stored on disk 6.

FIG. 12B illustrates another example similar to the example shown in FIG. 12A. In FIG. 12B, a disk 0, which is storing data $D_0$ of a first stripe, has failed or is failing and disks 1-12 are healthy. At time T0, the failure (e.g., failed, failing, offline, etc.) of disk 0 is detected (e.g., by detection module 302). In response to the failure of disk 0, the parity module 304 retrieves and/or collects the P parity data for data segments $D_0$, $D_1$, and $D_2$ stored on disks 0 through 2, respectively, of a first data stripe stored on disk 3 (e.g., P parity data P1) and the P parity data for data segments $D_0$, $D_1$, and $D_2$ stored on disks 5-7, respectively, of a second data stripe stored on disk 8 (e.g., P parity data P2) at time T1. Further at time T1 and in response to the failure of disk 0, the parity module 304 retrieves and/or collects the Q parity data for data segments $D_0$, $D_1$, and $D_2$ stored on disks 0 through 2 of the first data stripe stored on disk 4 (e.g., Q parity data Q1) and the Q parity data for data segments $D_0$, $D_1$, and $D_2$ stored on disks 5-7, respectively, of a second data stripe stored on disk 9 (e.g., Q parity data Q2).

At time T2, a calculation module 306, calculates a new parity $P_{new}$ for the data $D_0$-$D_2$ stored on disks 0-2 and the data $D_0$-$D_2$ stored on disks 5-7. The calculated new parity $P_{new}$ is the merged parity data for the parity data P1 on disk 3 and the parity data P2 on disk 8. In other words, the calculated new parity $P_{new}$ is a combination of the parity data P1 and the parity data P2.

Further at time T2, the calculation module 306, calculates a new parity $Q_{new}$ for the data $D_0$-$D_2$ stored on disks 0-2 and the data $D_0$-$D_2$ stored on disks 5-7. The calculated new parity $Q_{new}$ is the merged parity data for the parity data Q1 on disk 4 and the parity data Q2 on disk 9. In other words, the calculated new parity $Q_{new}$ is a combination of the parity data Q1 and the parity data Q2.

The parity module 304, at time T3, may then replace (e.g., write over (e.g., delete and write)) the parity data P1 on disk 3 with the new parity $P_{new}$ and replace (e.g., write over (e.g., delete and write)) the parity data Q1 on disk 4 with the new parity $Q_{new}$. At time T4, the parity module 304 may delete the parity data P2 from disk 8 to create and/or free up space on disk 8 so that the data $D_0$ stored on failed/failing disk 0 may be rebuilt thereon.

Further at time T4, the parity module 304 may delete the parity data Q2 from disk 9 to create and/or free up space on disk 9 so that the data $D_0$ stored on failed/failing disk 0 may also be rebuilt thereon. In some embodiments, the parity module 304 can perform the operations at times T3 and T4 in parallel (e.g., at the same or substantially the same time) or can reverse the order in which the operations at times T3 and T4 are performed.

One effect of the operations performed at times T0-T4 is to increase the width of the first stripe to include the data stored on disks 0-7, as illustrated at time T5 of FIG. 11A. That is, at time T5, the first stripe is across disks 0-7 and disks 8 and 9 now include free space for rebuilding the data $D_0$ stored on failed/failing disk 0. Further at time T5, a rebuild module 308 can utilize the free space in disks 8 and 9 to rebuild the data $D_0$ that was stored on disk 0.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. A system, comprising:
    a detection module that detects disk failures in a redundant array of independent disks (RAID) configuration, the RAID configuration further comprising a first disk storing a segment of a first data stripe, a second disk storing a first parity stripe for the first data stripe at a first storage location, and a third disk storing a second parity stripe for a second data stripe at a second storage location;
    a parity module that, in response to the detection module detecting a disk failure of the first disk in the RAID configuration:
        merges the first parity data and the second parity data by calculating a combined parity of the first data stripe and the second data stripe to generate a new parity data for the first data stripe and the second data stripe, and replaces one of the first parity data and the second parity data with the new parity data; and
    a rebuild module that replaces a different one of the first parity data and the second parity data with the segment of the first data stripe,
    wherein at least a portion of said modules comprise one or more of a set of hardware circuits, a set of programmable hardware devices, and executable code stored on a set of computer-readable storage media.

2. The system of claim 1, wherein replacing the one of the first parity data and the second parity data with the new parity data comprises one of:
    deleting the first parity data from the first storage location on the second disk to create first free space at the first storage location and writing the new parity data to the first free space at first storage location on the second disk, wherein the first storage location stored the first parity data prior to the first parity data and the second parity data being merged; and
    deleting the second parity data from the first storage location of the second disk to create first free space at the first storage location and writing the new parity data to the first free space at the first storage location on the second disk, wherein the first storage location stored the second parity data prior to the first parity data and the second parity data being merged.

3. The system of claim 2, wherein replacing the different one of the first parity data and the second parity data with the segment of the data at the second storage location on the third disk comprises one of:
    deleting the second parity data from the second storage location on the third disk to create second free space at the second storage location on the third disk and writing the segment of the data to the second free space at the second storage location on the third disk in response to the new parity data replacing the first parity data at the first storage location on the second disk, wherein the second storage location stored the second parity data prior to the first parity data and the second parity data being merged; and
    deleting the first parity data from the second storage location on the third disk to create second free space at the second storage location on the third disk and writing the segment of the data to the second free space at the second storage location on the third disk in response to the new parity data replacing the second parity data at the first storage location on the second disk, wherein the second storage location stored the first parity data prior to the first parity data and the second parity data being merged.

4. The system of claim 3, wherein:
    the first data stripe comprises a first parity segment and a second parity segment;
    the first parity segment stores a first P parity data;
    the first P parity data comprises the first parity data;
    the second parity segment stores a first Q parity data;
    the second data stripe comprises a third parity segment and a fourth parity segment;
    the third parity segment stores a second P parity data;
    the second P parity data comprises the second parity data; and
    the fourth parity segment stores a second Q parity data.

5. The system of claim 4, wherein the parity module comprises:
    a calculation module that calculates new P parity data and new Q parity data,
    wherein:
        the calculation module is configured to, in response to the disk failure of the first disk, calculate a combined P parity of the first data stripe and the second data stripe to generate a new P parity data based on the first P parity data and the second P parity data,
        the calculation module is configured to, in response to the disk failure of the first disk, calculate a combined Q parity of the first data stripe and the second data stripe to generate a new Q parity data based on the first Q parity data and the second Q parity data,
        the parity module is configured to replace one of the first P parity data and the second P parity data with the new P parity data at the first storage location on the second disk in the RAID configuration,
        the rebuild module is configured to replace a different one of the first P parity data and the second P parity data with a first rebuild of the segment of the data at the second storage location on the third disk of the RAID configuration, the parity module is configured to replace one of the first Q parity data and the second Q parity data with the new Q parity data at a third storage location on a fourth disk in the RAID configuration, and the rebuild module is configured to replace a different one of the first Q parity data and the second Q parity data with a second rebuild of the segment of the data at a fourth storage location on a fifth disk of the RAID configuration.

6. The system of claim 1, wherein: the new P parity and the new Q parity are written to different disks on a first same stripe; the first rebuild of the data and the second rebuild of the data are written to different disks on a second same stripe; and the first same stripe and the second same stripe are different stripes.

7. The system of claim 1, wherein: the new P parity data is calculated utilizing a bitwise addition modulo-2 function; and the new Q parity data is calculated utilizing one of: the bitwise addition modulo-2 function, and a set of polynomial functions of weighted XOR operations.

8. A method, comprising:

detecting, by a processor, a disk failure of a first disk in a redundant array of independent disks (RAID) configuration, the RAID configuration further comprising the first disk storing a segment of a first data stripe, a second disk storing a first parity stripe for the first data stripe at a first storage location, and a third disk storing a second parity stripe for a second data stripe at a second storage location; and in response to detecting the disk failure:

merging the first parity data and the second parity data by calculating a combined parity of the first data stripe and the second data stripe to generate a new parity data for the first data stripe and the second data stripe, replacing one of the first parity data and the second parity data with the new parity data, and replacing a different one of the first parity data and the second parity data with the segment of the first data stripe.

9. The method of claim 8, wherein replacing the one of the first parity data and the second parity data with the new parity comprises one of:

deleting the first parity data from the first storage location on the second disk to create first free space at the first storage location and writing the new parity data to the first free space at first storage location on the second disk, wherein the first storage location stored the first parity data prior to the first parity data and the second parity data being merged; and deleting the second parity data from the first storage location of the second disk to create first free space at the first storage location and writing the new parity data to the first free space at the first storage location on the second disk, wherein the first storage location stored the second parity data prior to the first parity data and the second parity data being merged.

10. The method of claim 9, wherein replacing the different one of the first parity data and the second parity data with the segment of the data at the second storage location on the third disk comprises one of:

deleting the second parity data from the second storage location on the third disk to create second free space at the second storage location on the third disk and writing the segment of the data to the second free space at the second storage location on the third disk in response to the new parity data replacing the first parity data at the first storage location on the second disk, wherein the second storage location stored the second parity data prior to the first parity data and the second parity data being merged; and deleting the first parity data from the second storage location on the third disk to create second free space at the second storage location on the third disk and writing the segment of the data to the second free space at the second storage location on the third disk in response to the new parity data replacing the second parity data at the first storage location on the second disk, wherein the second storage location stored the first parity data prior to the first parity data and the second parity data being merged.

11. The method of claim 10, wherein:

the first data stripe comprises a first parity segment and a second parity segment;

the first parity segment stores a first P parity data;

the first P parity data comprises the first parity data;

the second parity segment stores a first Q parity data;

the second data stripe comprises a third parity segment and a fourth parity segment;

the third parity segment stores a second P parity data;

the second P parity data comprises the second parity data; and the fourth parity segment stores a second Q parity data.

12. The method of claim 11, wherein:

merging the first parity data for the first data stripe and the second parity data for the second data stripe further comprises:

calculating a combined P parity of the first data stripe and the second data stripe to generate a new P parity data; and calculating a combined Q parity of the first data stripe and the second data stripe to generate a new Q parity data, wherein:

the calculated new P parity data is based on the first P parity data and the second P parity data, and the calculated new Q parity data is based on the first Q parity data and the second Q parity data;

the one of the first P parity data and the second P parity data is replaced with the new P parity data at the first storage location on the second disk in the RAID configuration; and the method further comprises:

replacing a different one of the first P parity data and the second P parity data with a first rebuild of the segment of the data at the second storage location on the third disk of the RAID configuration, replacing one of the first Q parity data and the second Q parity data with the new Q parity data at a third storage location on a fourth disk in the RAID configuration, and replacing a different one of the first Q parity data and the second Q parity data with a second rebuild of the segment of the data at a fourth storage location on a fifth disk of the RAID configuration.

13. The method of claim 8, wherein: the new P parity and the new Q parity are written to different disks on a first same stripe; the first rebuild of the data and the second rebuild of the data are written to different disks on a second same stripe; and the first same stripe and the second same stripe are different stripes.

14. The method of claim 8, wherein: the new P parity data is calculated utilizing a bitwise addition modulo-2 function; and the new Q parity data is calculated utilizing one of: the bitwise addition modulo-2 function, and a set of polynomial functions of weighted XOR operations.

15. A computer program product comprising a computer-readable storage medium including program instructions embodied therewith, the program instructions executable by a processor to cause the processor to:
   detect a disk failure of a first disk in a redundant array of independent disks (RAID) configuration, the RAID configuration further comprising the first disk storing a segment of a first data stripe, a second disk storing a first parity stripe for the first data stripe at a first storage location, and a third disk storing a second parity stripe for a second data stripe at a second storage location; and
   in response to detecting the disk failure:
      merge a first parity data and a second parity data by calculating a combined parity of the first data stripe and the second data stripe to generate a new parity data for the first data stripe and the second data stripe,
      replace one of the first parity data and the second parity data with the new parity data, and
      replace a different one of the first parity data and the second parity data with the segment of the first data stripe.

16. The computer program product of claim 15, wherein the program instructions that cause the processor to replace the one of the first parity data and the second parity data with the new parity further causes the processor to one of:
   delete the first parity data from the first storage location on the second disk to create first free space at the first storage location and write the new parity data to the first free space at first storage location on the second disk, wherein the first storage location stored the first parity data prior to the first parity data and the second parity data being merged; and
   delete the second parity data from the first storage location of the second disk to create first free space at the first storage location and write the new parity data to the first free space at the first storage location on the second disk, wherein the first storage location stored the second parity data prior to the first parity data and the second parity data being merged.

17. The computer program product of claim 16, wherein the program instructions that cause the processor to replace the different one of the first parity data and the second parity data with the segment of the data at the second storage location on the third disk comprise program instructions that further cause the processor to one of:
   delete the second parity data from the second storage location on the third disk to create second free space at the second storage location on the third disk and writing the segment of the data to the second free space at the second storage location on the third disk in response to the new parity data replacing the first parity data at the first storage location on the second disk, wherein the second storage location stored the second parity data prior to the first parity data and the second parity data being merged; and
   delete the first parity data from the second storage location on the third disk to create second free space at the second storage location on the third disk and writing the segment of the data to the second free space at the second storage location on the third disk in response to the new parity data replacing the second parity data at the first storage location on the second disk, wherein the second storage location stored the first parity data prior to the first parity data and the second parity data being merged,
wherein:
   the first data stripe comprises of a first parity segment and a second parity segment,
   the first parity segment stores a first P parity data,
   the first P parity data comprises the first parity data,
   the second parity segment stores a first Q parity data,
   the second data stripe comprises a third parity segment and a fourth parity segment,
   the third parity segment stores a second P parity data,
   the second P parity data comprises the second parity data, and
   the fourth parity segment stores a second Q parity data.

18. The computer program product of claim 17, wherein: the program instructions that cause the processor to merge the first parity data for the first data stripe and the second parity data for the second data stripe comprises program instructions that further cause the processor to:
   calculate a combined P parity of the first data stripe and the second data stripe to generate a new P parity data, and
   calculate a combined Q parity of the first data stripe and the second data stripe to generate a new Q parity data,
wherein:
   the calculated new P parity data is based on the first P parity data and the second P parity data, and the calculated new Q parity data is based on the first Q parity data and the second Q parity data;
the one of the first P parity data and the second P parity data is replaced with the new P parity data at the first storage location on the second disk in the RAID configuration; and
the program instructions further cause the processor to:
   replace a different one of the first P parity data and the second P parity data with a first rebuild of the segment of the data at the second storage location on the third disk of the RAID configuration,
   replace one of the first Q parity data and the second Q parity data with the new Q parity data at a third storage location on a fourth disk in the RAID configuration, and
   replace a different one of the first Q parity data and the second Q parity data with a second rebuild of the segment of the data at a fourth storage location on a fifth disk of the RAID configuration.

19. The computer program product of claim 15, wherein: the new P parity and the new Q parity are written to different disks on a first same stripe; the first rebuild of the data and the second rebuild of the data are written to different disks on a second same stripe; and the first same stripe and the second same stripe are different stripes.

20. The computer program product of claim 15, wherein: the new P parity data is calculated utilizing a bitwise addition modulo-2 function; and the new Q parity data is calculated utilizing one of: the bitwise addition modulo-2 function, and a set of polynomial functions of weighted XOR operations.

* * * * *